US012688282B2

(12) United States Patent
Shavit et al.

(10) Patent No.: US 12,688,282 B2
(45) Date of Patent: Jul. 21, 2026

(54) MALICIOUS ACTIVITY DETECTION FOR CLOUD COMPUTING PLATFORMS

(71) Applicant: Microsoft Technology Licensing, LLC, Redmond, WA (US)

(72) Inventors: Shalom Shay Shavit, Yehud (IL); Ram Haim Pliskin, Rishon Lezion (IL); Daniel Davraev, Or Yehuda (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/332,376

(22) Filed: Jun. 9, 2023

(65) Prior Publication Data

US 2024/0330445 A1 Oct. 3, 2024

Related U.S. Application Data

(60) Provisional application No. 63/492,327, filed on Mar. 27, 2023.

(51) Int. Cl.
*G06F 21/55* (2013.01)
*G06F 21/56* (2013.01)

(52) U.S. Cl.
CPC .......... *G06F 21/554* (2013.01); *G06F 21/552* (2013.01); *G06F 21/562* (2013.01)

(58) Field of Classification Search
CPC ..... G06F 21/554; G06F 21/552; G06F 21/562
USPC ........................................................ 726/22
See application file for complete search history.

(56) References Cited

U.S. PATENT DOCUMENTS

| | | | |
|---|---|---|---|
| 7,991,827 B1 | 8/2011 | Whitmore | |
| 9,479,518 B1 * | 10/2016 | Fang ................... | H04L 63/1425 |
| 10,192,052 B1 * | 1/2019 | Singh .................... | G06F 21/562 |
| 11,108,621 B1 | 8/2021 | Shirvani | |
| 12,341,796 B2 | 6/2025 | Techentin | |
| 2015/0067845 A1 * | 3/2015 | Chari ...................... | G06F 21/50 |
| | | | 726/23 |

(Continued)

FOREIGN PATENT DOCUMENTS

| | | |
|---|---|---|
| WO | 2022100719 A1 | 5/2022 |

OTHER PUBLICATIONS

International Search Report and Written Opinion received for PCT Application No. PCT/US2024/025895, Jul. 5, 2024, 18 pages.
Wang, et al., "A Unified Trustworthy Environment Establishment Based on Edge Computing in Industrial IoT," IEEE Transactions On Industrial Informatics, IEEE Service Center, New York, NY, US, vol. 16, No. 9, Nov. 21, 2019, pp. 6083-6091.

(Continued)

*Primary Examiner* — Jacob Lipman
(74) *Attorney, Agent, or Firm* — Weaver IP L.L.C.

(57) ABSTRACT

Malicious activity detection is enabled for cloud computing platforms. A first log comprising a record of a first control plane operation executed by a cloud application associated with an entity is obtained. A plurality of second logs, each comprising a record of a respective second control plane operation executed in association with the entity, is obtained. A first property set is generated based on the first log and a second property set is generated based on the plurality of second logs. A malicious activity score indicative of a degree to which the first control plane operation is anomalous with respect to the entity is determined based on the first property set and the second property set. A determination that the first control plane operation potentially corresponds to malicious activity is made based on the malicious activity score and a security alert is generated.

20 Claims, 7 Drawing Sheets

400

Obtain a first log comprising a record of a first control plane operation executed by a cloud application associated with an entity — 402

Obtain a plurality of second logs, wherein each of the second logs comprises a record of a respective second control plane operation executed in association with the entity — 404

Generate a first property set based on the first log and a second property set based on the plurality of second logs — 406

Determine, based on the first property set and the second property set, a malicious activity score indicative of a degree to which the first control plane operation is anomalous with respect to the entity — 408

Determine, based on the determined malicious activity score, the first control plane operation potentially corresponds to malicious activity — 410

Responsive to the determination the first control plane operation potentially corresponds to malicious activity, generate a security alert — 412

(56) References Cited

U.S. PATENT DOCUMENTS

| | | | |
|---|---|---|---|
| 2015/0220735 A1* | 8/2015 | Paithane | G06F 9/45558 726/23 |
| 2016/0180557 A1* | 6/2016 | Yousaf | G06F 21/50 715/762 |
| 2017/0032143 A1* | 2/2017 | Kong | G06F 21/6263 |
| 2017/0251013 A1 | 8/2017 | Kirti | |
| 2017/0353477 A1 | 12/2017 | Faigon | |
| 2018/0189128 A1 | 7/2018 | Qiao et al. | |
| 2018/0219888 A1 | 8/2018 | Apostolopoulos | |
| 2018/0262529 A1* | 9/2018 | Allen | G06F 21/566 |
| 2019/0098037 A1 | 3/2019 | Shenoy, Jr. et al. | |
| 2020/0076677 A1 | 3/2020 | Mermoud et al. | |
| 2020/0110873 A1 | 4/2020 | Rosendahl | |
| 2020/0213338 A1* | 7/2020 | Lotem | G06N 20/00 |
| 2020/0285737 A1 | 9/2020 | Kraus | |
| 2020/0310889 A1 | 10/2020 | Levin | |
| 2020/0336503 A1 | 10/2020 | Xu | |
| 2022/0086180 A1 | 3/2022 | Karpovsky et al. | |
| 2023/0169168 A1 | 6/2023 | Magen Medina | |
| 2023/0267198 A1* | 8/2023 | Karpovsky | G06F 21/552 726/23 |
| 2023/0379346 A1 | 11/2023 | Goldstein | |
| 2024/0195830 A1 | 6/2024 | Jayaraman | |
| 2024/0214348 A1 | 6/2024 | Benameur | |
| 2024/0354402 A1 | 10/2024 | Alves Vidal De Seabra | |
| 2024/0380767 A1 | 11/2024 | Davraev | |
| 2025/0209164 A1 | 6/2025 | Magen Medina | |
| 2025/0392600 A1 | 12/2025 | Kwon | |

OTHER PUBLICATIONS

International Search Report and Written Opinion received for PCT Application No. PCT/US2024/019324, Jun. 4, 2024, 11 pages.

Non-Final Office Action mailed on Jul. 8, 2025, in U.S. Appl. No. 18/313,592, 19 pages.

International Preliminary Report on Patentability (Chapter I) received for PCT Application No. PCT/US2024/019324, Oct. 9, 2025, 6 pages.

"International Search Report and Written Opinion Issued in PCT Application No. PCT/US23/019016", Mailed on Aug. 9, 2023, 11 Pages.

Final Office Action mailed on Jul. 1, 2025, in U.S. Appl. No. 17/747,366, 18 pages.

Final Office Action mailed on Nov. 25, 2024, in U.S. Appl. No. 17/747,366, 16 pages.

Non-Final Office Action mailed on Mar. 14, 2025, in U.S. Appl. No. 17/747,366, 17 Pages.

Non-Final Office Action mailed on May 29, 2024, in U.S. Appl. No. 17/747,366, 11 pages.

Notice of Allowance mailed on Nov. 28, 2025, in U.S. Appl. No. 17/747,366, 11 Pages.

Notice of Allowance mailed on Jan. 30, 2026, in U.S. Appl. No. 18/313,592, 16 pages.

Notice of Allowance mailed on Mar. 31, 2026, in U.S. Appl. No. 18/313,592, 16 pages.

Notice of Allowance mailed on Apr, 9, 2026, in U.S. Appl. No. 17/747,366, 10 pages.

* cited by examiner

400

| | |
|---|---|
| Obtain a first log comprising a record of a first control plane operation executed by a cloud application associated with an entity | 402 |

↓

| | |
|---|---|
| Obtain a plurality of second logs, wherein each of the second logs comprises a record of a respective second control plane operation executed in association with the entity | 404 |

↓

| | |
|---|---|
| Generate a first property set based on the first log and a second property set based on the plurality of second logs | 406 |

↓

| | |
|---|---|
| Determine, based on the first property set and the second property set, a malicious activity score indicative of a degree to which the first control plane operation is anomalous with respect to the entity | 408 |

↓

| | |
|---|---|
| Determine, based on the determined malicious activity score, the first control plane operation potentially corresponds to malicious activity | 410 |

↓

| | |
|---|---|
| Responsive to the determination the first control plane operation potentially corresponds to malicious activity, generate a security alert | 412 |

| | |
|---|---|
| Mitigate the first control plane operation based on the determination the first control plane operation potentially corresponds to malicious activity | 502 |

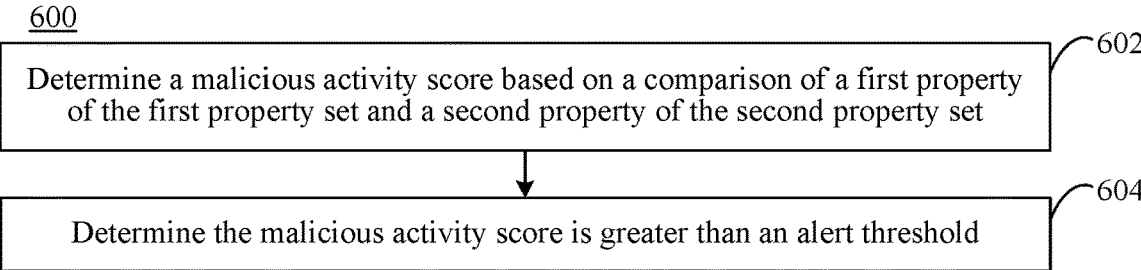

| | |
|---|---|
| Determine a malicious activity score based on a comparison of a first property of the first property set and a second property of the second property set | 602 |
| Determine the malicious activity score is greater than an alert threshold | 604 |

FIG. 6

MALICIOUS ACTIVITY DETECTION FOR CLOUD COMPUTING PLATFORMS

CROSS-REFERENCE TO RELATED APPLICATIONS

This application claims priority to U.S. Provisional Patent Application Ser. No. 63/492,327, filed Mar. 27, 2023, the entirety of which is incorporated by reference herein.

BACKGROUND

Cloud computing platforms offer higher efficiency, greater flexibility, lower costs, and better performance for applications and services relative to "on-premises" servers and storage. Accordingly, users are shifting away from locally maintaining applications, services, and data and migrating to cloud computing platforms. One of the pillars of cloud services are compute resources, which are used to execute code, run applications, and/or run workloads in a cloud computing platform. These resources have gained the interest of malicious entities, such as hackers. Hackers attempt to gain access to cloud subscriptions and user accounts in an attempt to deploy compute resources and leverage the resources for their own malicious purposes.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments described herein enable malicious activity detection for cloud computing platforms. In an aspect, a first log is obtained. The first log comprises a record of a first control plane operation executed by a cloud application associated with an entity. A plurality of second logs is obtained. Each of the second logs comprises a record of a respective second control plane operation executed in association with the entity. A first property set is generated based on the first log and a second property set is generated based on the plurality of second logs. A malicious activity score indicative of a degree to which the first control plane operation is anomalous with respect to the entity is determined based at least on the first property set and the second property set. A determination that the first control plane operation potentially corresponds to malicious activity is made based at least on the determined malicious activity score. Responsive to the determination that the first control plane operation potentially corresponds to malicious activity, a security alert is generated.

In a further aspect of the present disclosure, the first control plane is mitigated based on the determination that the first control plane operation potentially corresponds to malicious activity.

In a further aspect of the present disclosure, the malicious activity score is determined based at least on a comparison of a first property of the first property set and a second property of the second property set, and is further determined to have a value greater than an alert threshold.

In a further aspect of the present disclosure, a third log is obtained that comprises a record of a third control plane operation executed in association with the entity in proximity to the first control plane operation. A determination is made that the third log is indicative of malicious activity. Responsive to this determination, an alert threshold is decreased.

In another aspect of the present disclosure, the first log is obtained. The first log comprises a record of a first control plane operation executed by a cloud application associated with an entity. The first property set is generated based on the first log. A third log is obtained comprising a record of a third control plane operation executed in association with the entity in proximity to the first control plane operation. A determination is made that the third log is included in a list of impactful operations is made. Responsive to this determination, a further determination is made that the first control plane operation potentially corresponds to malicious activity. Responsive to this further determination, a security alert is generated.

In another aspect of the present disclosure, the first log is obtained. The first log comprises a record of a first control plane operation executed by a cloud application associated with an entity. The first property set is generated based on the first log. Trend data are obtained indicative of previously executed control plane operations associated with the entity. A malicious activity score indicative of a degree to which the first control plane operation is anomalous with respect to the entity is determined based at least on the first property set and the trend data. A determination that the first control plane operation potentially corresponds to malicious activity is made based at least on the determined malicious activity score. Responsive to this determination, a security alert is generated.

Further features and advantages of the embodiments, as well as the structure and operation of various embodiments, are described in detail below with reference to the accompanying drawings. It is noted that the claimed subject matter is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

FIG. 4 shows a flowchart of a process for detecting malicious creation of resources, in accordance with an embodiment.

FIG. 5 shows a flowchart of a process for mitigating a control plane operation, in accordance with an embodiment.

FIG. 6 shows a flowchart of a process for determining that a control plane operation potentially corresponds to malicious activity, in accordance with an embodiment.

Figure 1:
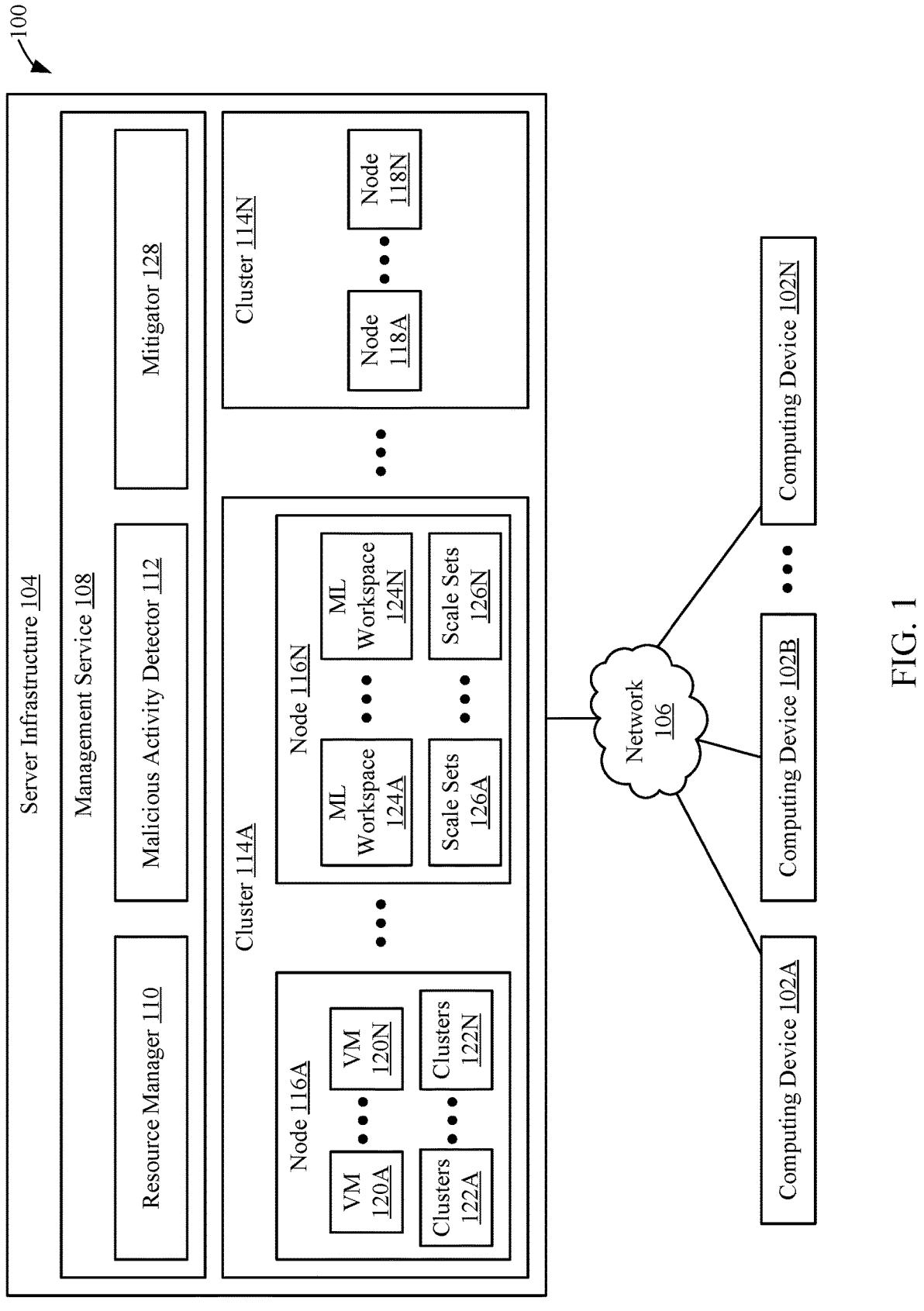
FIG. 1 shows a block diagram of an example network-based computing system configured to detect malicious creation of resources in a cloud network, in accordance with an embodiment.

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Cloud-based systems utilize compute resources to execute code, run applications, and/or run workloads. Examples of compute resources include, but are not limited to, virtual machines, virtual machine scale sets, clusters (e.g., Kubernetes clusters), machine learning (ML) workspaces (e.g., a group of compute intensive virtual machines for training machine learning models and/or performing other graphics processing intensive tasks), serverless functions, and/or other compute resources of cloud computing platforms. Those type of resources are used by user (e.g., customers) to run code, applications and workload in cloud environments which they are billed for based on the usage, scale and compute power the customer consume. A cloud service provider may implement or otherwise use a centralized mechanism to monitor and control the creation and/or deployment of compute resources in the cloud computing platform. However, malicious entities, such as hackers, may attempt to gain access to cloud subscriptions and user accounts in an attempt to deploy compute resources and leverage the resources for their own malicious purposes.

In particular, with the uprise of crypto currencies and crypto mining, where one can use massive compute power to mine crypto currency, attackers have started to compromise cloud resources and accounts in order to deploy compute resources for crypto mining. By compromising cloud accounts and resources, an attacker can create powerful compute instances and cause significant money loss to the compromised customers because the customer is the one paying the bill for the compute resources created by the attacker, while the attacker gains money by mining crypto currency coins with the compromised compute resources.

According to embodiments, cloud control plane logs are utilized to identify cases where a cloud and/or user account is compromised, and malicious creation of compute resources takes place. Multiple control plane operations are taken into account, such as the creation of virtual machines, virtual machine scale-set and compute resource quota increase requests, etc. Properties such as the following are extracted from the operations: scale set capacity, virtual machine type, CPU (central processing unit) size, the presence of graphics card, and the region and compute type of the quota increase request. Data per subscription is aggregated and compared with the average, median, and maximum capacity, and the number of resources created previously in the subscription. An alert is triggered when the current inspected slice fails to follow the trend set by the metrics mentioned above. The compute resource quota increase request is used as an additional indicator that allows a deviation threshold to be dynamically lowered as it raises the suspiciousness of resource creation requests that may follows.

These and further embodiments described herein are directed to malicious activity detection for cloud computing platforms. In accordance with an embodiment, a system and method perform threat detection by detecting control plane operations (e.g., resource management operations, resource configuration operations, resource access enablement operations, etc.) that may be indicative of malicious behavior. For example, if a malicious entity, such as a hacker, compromises an application or computing device associated with a cloud-based system, the malicious entity may perform control plane operations to create and/or deploy compute resources and utilize the compute resources for malicious activity. For instance, a hacker may access a compromised account and deploy compute resources for mining crypto currencies.

However, compute resources may be created and/or deployed as part of their intended operation. Moreover, in a cloud-based system, an extremely large volume of control plane operations (including operations to create and/or deploy compute resources) may be executed over a relatively short time period. For at least these reasons, it is not trivial to distinguish between malicious and benign creation and/or deployment of compute resources. In accordance with an embodiment, a malicious activity detector is configured to leverage logs that comprise records of the execution of control plane operations in order to determine anomaly scores indicative of how anomalous a control plane operation is with respect to an entity (e.g., an anomaly score indicative of a degree to which a control plane operation is anomalous with respect to an entity). For example, in one aspect of the present disclosure, a log comprising a record of a first control plane operation executed by a cloud application associated with an entity is obtained. A plurality of second logs is obtained, wherein each of the second logs comprises a record of a respective second control plane operation associated with an entity. A first property set is generated based on the first log and a second property set is based on the plurality of second logs. A malicious activity score indicative of a degree to which the first control plane operation is anomalous with respect to the entity is determined based (e.g., at least) on the first property set and the second property set. A determination that the first control plane operation potentially corresponds to malicious activity is made based (e.g., at least) on the determined malicious activity score. Responsive to the determination that the first control plane operation potentially corresponds to malicious activity, a security alert is generated.

In embodiments, an "entity" may be a user account, a subscription, a tenant, or another entity that is provided services of a cloud computing platform by a cloud service provider. A malicious activity detector in accordance with an embodiment evaluates control plane operations executed by entities such as user accounts associated with the same subscription. In this context, the first control plane operation is associated with a first user account associated with the subscription and the plurality of second control plane operations is associated with (e.g., all or other) user accounts associated with the subscription. Depending on the implementation, a malicious activity detector evaluates control plane operations with respect to an individual user account, a subset of user accounts of a subscription, all user accounts of a subscription, user accounts of a tenant, user accounts of multiple tenants, and/or the like.

Embodiments and techniques described herein may evaluate various types of control plane operations. For example, a malicious activity detector in accordance with an embodiment considers control plane operations associated with the creation and/or deployment of compute resources (e.g., a create virtual machine operation, a create virtual machine scale-set operation, a compute resource quota increase request, and/or the like). Furthermore, malicious activity detectors described herein may consider other control plane operations in addition to (or alternative to) those associated with the creation and/or deployment of compute resources. Other such control plane operations include, but are not limited to, operations that, when executed, modify a rule of a firewall, create a rule of a firewall, access authentication keys (e.g., host keys, user keys, or public and private key pairs), modify a compute cluster, modify a security rule (e.g., a security alert suppression rule), create a security rule, access a storage (e.g., a secret storage), and/or otherwise impact the cloud-based system, an application associated with the cloud-based system, and/or an entity associated with the cloud-based system.

Embodiments and techniques described herein evaluate a degree to which a control plane operation (such as a compute resource creation operation) is anomalous with respect to an entity. For instance, historic activity of an entity is used to determine whether or not an execution of a control plane operation is anomalous. In this context, potential malicious activity is identified based at least on one or more of: a malicious activity score, surrounding operations, and other information relating to the execution of control plane operations, as described herein. By identifying potential malicious activity, embodiments may enable mitigation of malicious activity, thereby reducing unauthorized creation and/or use of compute resources, which conserves compute resources and reduces load to the cloud service network.

To help illustrate the aforementioned systems and methods, FIG. 1 will now be described. In particular, FIG. 1 shows a block diagram of an example network-based computing system 100 ("system 100" hereinafter) configured to detect malicious creation of resources in a cloud network, in accordance with an embodiment. As shown in FIG. 1, system 100 includes one or more computing devices 102A, 102B, and 102N (collectively referred to as "computing devices 102A-102N") and a server infrastructure 104. Each of computing devices 102A-102N and server infrastructure 104 are communicatively coupled to each other via network 106. Network 106 may comprise one or more networks such as local area networks (LANs), wide area networks (WANs), enterprise networks, the Internet, etc., and may include one or more of wired and/or wireless portions.

Server infrastructure 104 may be a network-accessible server set (e.g., a cloud-based environment or platform). As shown in FIG. 1, server infrastructure 104 includes a management service 108 and one or more clusters 114A and 114N (collectively referred to as "clusters 114A-114N"). Each of clusters 114A-114N may comprise a group of one or more nodes (also referred to as compute nodes) and/or a group of one or more storage nodes. For example, as shown in FIG. 1, cluster 114A includes nodes 116A-116N and cluster 114N includes nodes 118A-118N. Each of nodes 116A-116N and/or 118A-118N are accessible via network 106 (e.g., in a "cloud-based" embodiment) to build, deploy, and manage applications and services. Any of nodes 116A-116N and/or 118A-118N may be a storage node that comprises a plurality of physical storage disks that are accessible via network 106 and is configured to store data associated with the applications and services managed by nodes 116A-116N and/or 118A-118N.

In an embodiment, one or more of clusters 114A-114N may be co-located (e.g., housed in one or more nearby buildings with associated components such as backup power supplies, redundant data communications, environmental controls, etc.) to form a datacenter, or may be arranged in other manners. Accordingly, in an embodiment, one or more of clusters 114A-114N may be a datacenter in a distributed collection of datacenters.

Each of node(s) 116A-116N and 118A-118N may comprise one or more server computers, server systems, and/or computing devices. Each of node(s) 116A-116N and 118A-118N may be configured to execute one or more software applications (or "applications") and/or services and/or manage hardware resources (e.g., processors, memory, etc.), which may be utilized by users (e.g., customers) of the network-accessible server set. Node(s) 116A-116N and 118A-118N may also be configured for specific uses. For example, as shown in FIG. 1, node 116A executes virtual machines 102A-102N and clusters 122A-122N and node 116N executes ML workspaces 124A-124N and scale sets 126A-126N.

As shown in FIG. 1, management service 108 includes a resource manager 110, a malicious activity detector 112, and a mitigator 128. As also shown in FIG. 1, management service 108 is internal to server infrastructure 104. For instance, management service 108 may be incorporated as a service executing on a computing device of server infrastructure 104. For instance, management service 108 (or a subservice thereof) may be configured to execute on any of nodes 116A-116N and/or 118A-118N. Alternatively, management service 108 (or a subservice thereof) may be incorporated as a service executing on a computing device external to server infrastructure 104. Furthermore, any of resource manager 110, malicious activity detector 112, and/or mitigator 128 may be incorporated as the same service or subservice. As shown in FIG. 1, server infrastructure 104 includes a single management service 108; however, it is also contemplated herein that a server infrastructure may include multiple management services. For instance, server infrastructure 104 in accordance with an embodiment includes a separate management service for each cluster of clusters 114A-114N (e.g., respective cluster management services).

Computing devices 102A-102N may each be any type of stationary or mobile processing device, including, but not limited to, a desktop computer, a server, a mobile or handheld device (e.g., a tablet, a personal data assistant (PDA), a smart phone, a laptop, etc.), an Internet-of-Things (IoT) device, etc. Each of computing devices 102A-102N store data and execute computer programs, applications, and/or services.

Users are enabled to utilize the applications and/or services (e.g., management service 108 and/or subservices thereof, services executing on nodes 116A-116N and/or 118A-118N) offered by the network-accessible server set via computing devices 102A-102N. For example, a user may be enabled to utilize the applications and/or services offered by the network-accessible server set by signing-up with a cloud services subscription with a service provider of the network-accessible server set (e.g., a cloud service provider). Upon signing up, the user may be given access to a portal of server infrastructure 104, not shown in FIG. 1. A user may access the portal via computing devices 102A-102N (e.g., by a browser application executing thereon). For example, the user may use a browser executing on computing device 102A to traverse a network address (e.g., a uniform resource locator) to a portal of server infrastructure 104, which invokes a user interface (e.g., a web page) in a browser window rendered on computing device 102A. The user may be authenticated (e.g., by requiring the user to enter user credentials (e.g., a username, password, PIN, etc.)) before being given access to the portal.

Upon being authenticated, the user may utilize the portal to perform various cloud management-related operations (also referred to as "control plane" operations). Such operations include, but are not limited to, creating, deploying, allocating, modifying, and/or deallocating (e.g., cloud-based) compute resources; building, managing, monitoring, and/or launching applications (e.g., ranging from simple web applications to complex cloud-based applications); configuring one or more of node(s) 116A-116N and 118A-118N to operate as a particular server (e.g., a database server, OLAP (Online Analytical Processing) server, etc.); etc. Examples of compute resources include, but are not limited to, virtual machines, virtual machine scale sets, clusters, ML workspaces, serverless functions, storage disks (e.g., maintained by storage node(s) of server infrastructure 104), web applications, database servers, data objects (e.g., data file(s), table(s), structured data, unstructured data, etc.) stored via the database servers, etc. The portal may be configured in any manner, including being configured with any combination of text entry, for example, via a command line interface (CLI), one or more graphical user interface (GUI) controls, etc., to enable user interaction.

Resource manager 110 is configured to generate a log (also referred to as an "activity log") each time a user logs into his or her cloud services subscription via the portal. The log may be stored in one or more storage nodes of server infrastructure 104 and/or in a data storage external to server infrastructure 104. The period in which a user has logged into and logged off from the portal may be referred to as a portal session. Each log may include a record of a control plane operation that was executed during a given portal session (e.g., "create.VM" corresponding to the creation of a virtual machine, "create.scale_set" corresponding to the creation of a scale set, and/or the like), along with other characteristics associated with the control plane operation. For example, each log may include a record that specifies an identifier for the control plane operation; an indication as to whether the control plane operation was successful or unsuccessful; information about the resource that is created, deployed, and/or accessed, or was attempted to be created, deployed, and/or accessed (e.g., an identifier of the resource ("resource ID"), the name of the resource, the type of resource, the group the resource is associated with (e.g., if the resource was created as part of a group of created resources, if the resource was assigned to a group of resources, etc.)); a time stamp indicating a time at which the control plane operation was issued; a time stamp of the portal session in which the control plane operation was issued; a network address from which the control plane operation was issued (e.g., the network address associated with a computing device of computing devices 102A-102N); an application identifier that identifies an application (e.g., the portal or a browser application) from which the control plane operation was issued; a user identifier associated with a user (e.g., a username by which the user logged into the portal) that issued the control plane operation; other user identifying information of the user (e.g., an e-mail address of the user, the name of the user, a domain of the user (e.g., whether the user is internal or external to an organization)); an identifier of the cloud-based subscription from which the resource was created, deployed, and/or accessed or attempted to be created, deployed, and/or accessed; whether the control plane operation was issued by a user, a role, or a service principal; an identifier of the tenant that the subscription is associated with; a type of authentication scheme (e.g., password-based authentication, certificate-based authentication, biometric authentication, token-based authentication, multi-factor authentication, etc.) utilized by the user (or role, service principal, or other issuer) that issued the control plane operation; a network address the issuer (e.g., a user, a role, a service principal, etc.) authenticated from; an autonomous system number (ASN) associated with the issuer that issued the control plane operation (e.g., a globally unique identifier that defines a group of one or more Internet protocol (IP) prefixes utilized by a network operator that maintains a defined routing policy); an level of authorization of the issuer (e.g., permissions the issuer is granted, privileges the issuer is granted, security groups the issuer is associated with, etc.); etc. Furthermore, logs created by resource manager 110 may include additional metrics suitable for reporting and/or recording for review by other services, sub-systems, administrators, and/or users of a cloud-based network. In some embodiments, resource manager 110 (or another subservice of management service 108) removes some or all of a user's personal identifying information from logs or otherwise generates logs without some or all of a user's personally identifying information.

Malicious activity detector 112 is configured to detect malicious activity for cloud computing platforms. In accordance with an embodiment, malicious activity detector 112 analyzes logs comprising records of executions of control plane operations and determine whether such records are indicative of malicious activity. In accordance with an embodiment, malicious activity detector 112 detects attempts and/or executions of control plane operations that occur in a particular time period or window. It is noted that malicious activity detector 112 may be configured to analyze certain types of control plane operations. For instance, malicious activity detector 112 in accordance with an embodiment analyzes compute resource creation operations. In accordance with an embodiment, malicious activity detector 112 is implemented in and/or incorporated with an antivirus software (e.g., of a cloud computing platform). In accordance with an embodiment, malicious activity detector 112 is implemented in and/or incorporated with a security information and environment management application. Responsive to determining that a control plane operation potentially corresponds to malicious activity, malicious activity detector 112 generates a security alert.

In embodiments, malicious activity detector 112 analyzes a control plane operation with respect to additional information to determine if the control plane operation potentially corresponds to malicious activity. For instance, as described with respect to FIGS. 2-4 and 6, malicious activity detector 112 analyzes a first control plane operation executed with respect to an entity and a plurality of control plane operations historically executed with respect to the entity. In accordance with an embodiment, and as described with respect to FIGS. 7-10B, malicious activity detector 112 analyzes a first control plane operation and additional control plane operations executed in proximity to the first control plane operation. In accordance with an embodiment, and as described with respect to FIGS. 9-10B, malicious activity detector 112 identifies control plane operations executed in proximity to the first control plane operation that are more likely to be representative of malicious activity (e.g., "impactful operations," as described elsewhere herein). In accordance with an embodiment, and as described with respect to FIGS. 11 and 12, malicious activity detector 112 analyzes a first control plane operation and trend data representative of previously executed control plane operations.

Mitigator 128 mitigates a control plane operation in response to malicious activity detector 112 determining that the control plane operation is potentially associated with malicious activity. In this manner, mitigator 128 mitigates threats to a cloud computing platform based on determinations made by malicious activity detector 112. Depending on the implementation, mitigator 128 may mitigate a control plane operation automatically, cause another service (e.g., resource manager 110, malicious activity detector 112, or another service of system 100) to mitigate the control plane operation, or cause another component of system 100 to mitigate the control plane operation. Alternatively, control plane operations are manually mitigated (e.g., by a user of computing device 102, by an administrator of an enterprise system including computing device 102, or by a developer associated with system 100). In some embodiments, a combination of automatic and manual mitigation techniques is used to mitigate control plane operations. In accordance with an embodiment, mitigator 128 is implemented in and/or incorporated with an antivirus software (e.g., of a cloud computing platform). In accordance with an embodiment, mitigator 128 is implemented in and/or incorporated with a security information and environment management application.

Mitigator 128 may mitigate a control plane operation by transmitting a message to a computing device of a user corresponding to an account associated with the execution of the control plane operation, removing or deallocating compute resources created by the control plane operation, reverting changes made by the control plane operation (e.g., rolling back changes), remediating a compromised service account, remediating comprised resources and/or subscription, reviewing account activity, removing or modifying permissions granted to a user or service principal, identifying suspicious activities, changing credentials to an account, resource, or service, identifying and/or removing unfamiliar accounts, reviewing firewall or other antivirus program alerts, reviewing activity logs, and/or any other mitigating steps described elsewhere herein, or as would be understood by a person of skill in the relevant art(s) having benefit of this disclosure. As a non-limiting example, suppose malicious activity detector 112 determined a compute resource creation operation used to create virtual machines 120A-120N potentially corresponded to malicious activity. In this example, mitigator 128 reviews activities performed by the user account that issued the compute resource creation operation, removes permissions granted to the user account, removes virtual machines 120A-120N from node 116A, and transmits an alert to an administrator associated with the subscription the resources were created for.

Figure 2:
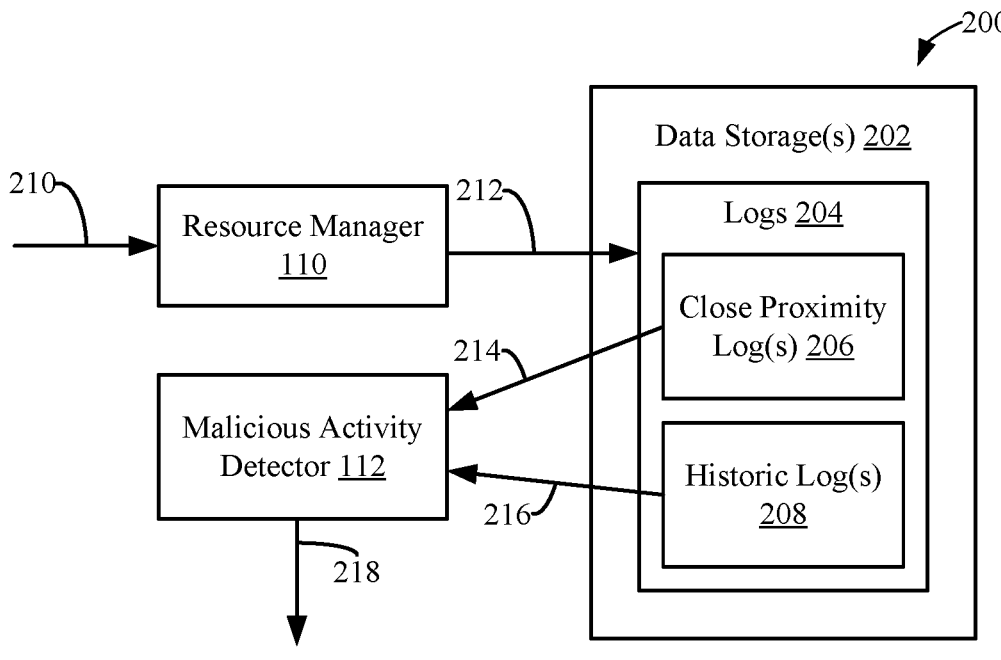
FIG. 2 shows a block diagram of a system in which a resource manager is configured to generate and store logs and a malicious activity detector is configured to access the stored logs, in accordance with an embodiment.

To help further illustrate the features of malicious activity detector 112 in accordance with embodiments, FIG. 2 will now be described. In particular, FIG. 2 shows a block diagram of a system 200 in which a resource manager is configured to generate and store logs and a malicious activity detector is configured to access the stored logs, in accordance with an embodiment. As shown in FIG. 2, system 200 includes: resource manager 110 and malicious activity detector 112, as described above with respect to FIG. 1, and data storage(s) 202 ("data storage 202" hereinafter). Data storage 202 stores one or more log(s) 204 ("logs 204" hereinafter) and/or any other information described herein. As shown in FIG. 2, data storage 202 is external to resource manager 110 and malicious activity detector 112; however, it is also contemplated that all or a portion of data storage 202 may be internal to a computing device executing either of resource manager 110 and/or malicious activity detector 112. Furthermore, data storage 202 may be included in a storage node of clusters 114A and/or 114N of FIG. 1, or in a storage device external to server infrastructure 104.

As described above, data storage 202 stores logs 204. Logs 204 include records of control plane operations executed by a cloud application associated with an entity. As shown in FIG. 2, logs 204 include one or more close proximity log(s) 206 ("close proximity logs 206" hereinafter) and one or more historic log(s) 208 ("historic logs 208" hereinafter). Close proximity logs 206 include logs stored in data storage 202 within a first predetermined time period (e.g., a predetermined number of minutes, hours, days, etc.) and historic logs 208 include logs stored in data storage 202 within a second predetermined time period longer than the first predetermined time period (e.g., a predetermined number of hours, days, weeks, months, etc.). For instance, in a non-limiting example, close proximity logs 206 include logs stored in data storage 202 within the last hour and historic logs 208 include logs stored in data storage 202 within the last 45 days. In some embodiments, historic logs 208 include close proximity logs 206. Alternatively, historic logs 208 are exclusive of close proximity logs 206.

As shown in FIG. 2, resource manager 110 receives information 210 from server infrastructure 104 of FIG. 1 (e.g., by network 106 or an internal network of server infrastructure 104) and generates log 212. Resource manager 110 stores log 212 in logs 204 in data storage 202 (e.g., as a close proximity log of close proximity logs 206). In accordance with an embodiment, resource manager 110 receives information 210 for a portal session of a user and generates log 212 associated with the portal session. As described above, log 212 includes a record of a control plane operation that was executed during a given portal session (if any), along with other details associated with the control plane operation.

As shown in FIG. 2, malicious activity detector 112 accesses stored close proximity log 214 of close proximity logs 206 ("log 214" hereinafter) and stored historic logs 216 of historic logs 208 ("logs 216" hereinafter), determines if a control plane operation that was executed and record in log 214 potentially corresponds to malicious activity, and if it is determined that the control plane operation potentially corresponds to malicious activity, generate a security alert 218. In accordance with an embodiment, and as discussed further with respect to FIGS. 3 and 4, malicious activity detector 112 generates a first property set based on log 214 and a second property set based on logs 216, determines a malicious activity score indicative of a degree to which the control plane operation is anomalous with respect to an entity based at least on the first and second property sets, determines that the control plane operation potentially corresponds to malicious activity based at least on the determined malicious activity score, and responsive to the determination that the control plane operation potentially corresponds to malicious activity, generates security alert 218. In accordance with a further embodiment, and as discussed with respect to FIG. 6, malicious activity detector 112 determines a malicious activity score based at least on a comparison of a first property of the first property set and a second property of the second property set and determines whether the malicious activity score is greater than an alert threshold. In accordance with a further embodiment, and as discussed with respect to FIGS. 7-10B, malicious activity detector 112 analyzes one or more logs comprising respective records of control plane operations executed in association with an entity in proximity to the control plane operation recorded in log 214 (also referred to as "surrounding operations" herein). For instance, malicious activity detector 112 may adjust an alert threshold based on the analysis of the surrounding operations (e.g., as described with respect to FIGS. 7 and 8) or determine that the control plane operation record in log 214 potentially corresponds to malicious activity (e.g., as described with respect to FIGS. 9 and 10).

As discussed above, logs 204 of FIG. 2 include close proximity logs 206 and historic logs 208. In some embodiments, historic logs 208 include close proximity logs 206. In some embodiments, resource manager 110 manages which logs are stored as close proximity logs 206 and which logs are stored as historic logs 208. For instance, resource manager 110 stores new logs (e.g., log 212) as close proximity logs of close proximity logs 206, periodically relocates logs from close proximity logs to historic logs 208 (e.g., relocating logs that were stored longer ago than the first predetermined time period), and removes logs from historic logs 208 (e.g., logs that were stored longer ago than the second predetermined time period). Alternatively, a separate service manages the relocation and removal of logs in data storage 202 (e.g., a log management service not shown in FIG. 2). Furthermore, as discussed above, historic logs 208 include logs stored in data storage 202 within a second predetermined time period longer than the first predetermined time period; however, it is also contemplated herein that historic logs 208 include all logs stored in data storage 202 for longer than the first predetermined time period. Furthermore, historic logs 208 may be limited by available storage space in data storages 202, or available storage space allocated for storing logs 204. For instance, historic logs 208 may include logs stored in data storage 202 for longer than the first predetermined time period up to a maximum number of logs stored or a maximum amount of storage space used to store logs. When storage space reaches a limit, resource manager 110 or a log management service (or other storage management service) removes the oldest logs to free space for newer logs.

Figure 3:
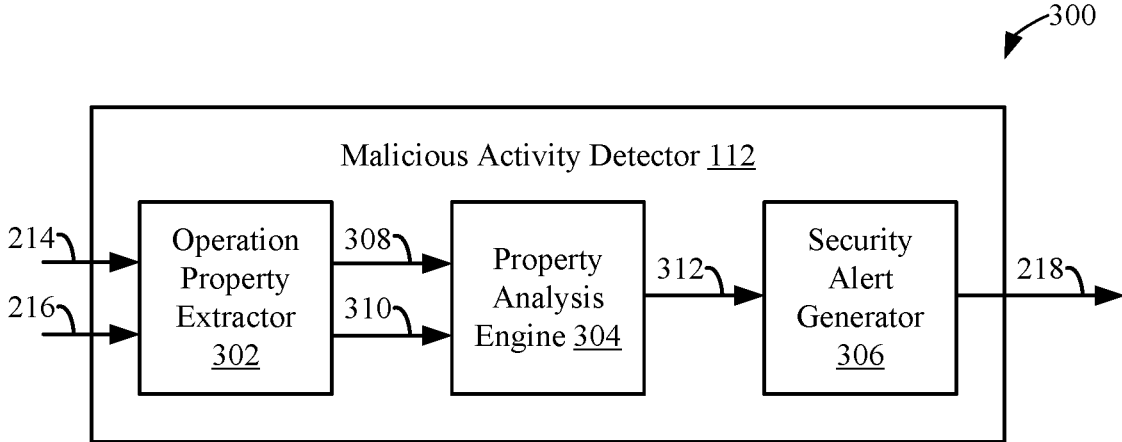
FIG. 3 shows a block diagram of the malicious activity detector of FIG. 1, in accordance with an embodiment.

Malicious activity detector 112 may be configured to detect potential malicious activity for cloud networks in various ways, in embodiments. For example, FIG. 3 shows a block diagram 300 of malicious activity detector 112 of FIG. 1, in accordance with an embodiment. As shown in FIG. 3, malicious activity detector 112 includes an operation property extractor 302, a property analysis engine 304, and a security alert generator 306. Depending on the implementation, each of operation property extractor 302, property analysis engine 304, and/or security alert generator 306 may be implemented as services executing on the same computing device. Alternatively, any of the components of malicious activity detector 112 may be executed on separate computing devices configured to communicate with each other over a network (e.g., network 106, an internal network of server infrastructure 104, and/or the like).

For illustrative purposes, malicious activity detector 112 of FIG. 3 is described below with respect to FIG. 4. FIG. 4 shows a flowchart 400 of a process for detecting malicious creation of resources, in accordance with an embodiment. Malicious activity detector 112 may operate according to flowchart 400 in embodiments. Note that not all steps of flowchart 400 need be performed in all embodiments. Further structural and operational embodiments will be apparent to persons skilled in the relevant art(s) based on the following description of FIGS. 3 and 4.

Flowchart 400 begins with step 402. In step 402, a first log is obtained. The first log comprises a record of a first control plane operation executed by a cloud application associated with an entity. For example, as shown in FIG. 3, operation property extractor 302 of malicious activity detector 112 obtains log 214 by accessing logs 204 stored in data storage 202, as described with respect to FIG. 2. Alternatively, logs (e.g., log 214) may be streamed to operation property extractor 302 (e.g., by resource manager 110 of FIG. 1). Operation property extractor 302 may obtain logs periodically (e.g., every hour, every two hours, at a particular (e.g., scheduled) time in the day), in response to a query (not shown in FIG. 3) received from a computing device (e.g., computing devices 102A-102N of FIG. 1) on behalf of a user (e.g., a customer user, an individual user, an administrator user, a service team user, etc.), in response to a query received from an application executing on a computing device, and/or the like. In some embodiments, operation property extractor 302 obtains multiple logs at once (e.g., multiple close proximity logs of close proximity logs 206).

In step 404, a plurality of second logs is obtained. Each of the second logs comprises a record of a respective second control plane operation executed in association with the entity. For example, as shown in FIG. 3, operation property extractor 302 of malicious activity detector 112 obtains logs 216 by accessing logs 204 stored in data storage 202, as described with respect to FIG. 2. Alternatively historic logs are streamed to operation property extractor 302. Operation property extractor 302 may obtain logs 216 periodically, in response to a query received from a computing device on behalf of a user, in response to a query received from an application executing on a computing device, and/or the like.

As shown in FIG. 3, operation property extractor 302 obtains logs 216 separately from log 214. Alternatively, operation property extractor 302 obtains log 214 and logs 216 as a group of logs (e.g., simultaneously). In this context, operation property extractor 302 determines which log to analyze with respect to other logs based on time stamps included in the logs. For instance, operation property extractor 302 determines which log is the most recently created log (or another log created within a first predetermined time) and analyzes that log as the "first log" described with respect to step 402 and the remaining logs as the "plurality of second logs" described with respect to step 404.

In accordance with an embodiment, operation property extractor 302 accesses logs 204 to obtain logs 216 based on information included in log 214 (e.g., an operation property extracted therefrom, as described with respect to step 406). For instance, operation property extractor 302 in a non-limiting example determines an identifier of an entity associated with the execution of a first control operation recorded in log 214 and accesses logs 204 to obtain other logs (e.g., historic logs of historic logs 208) executed by cloud application(s) associated with the entity based on the determined identifier of the entity.

In step 406, a first property set is generated based on the first log and a second property set is generated based on the plurality of second logs. For example, operation property extractor 302 generates a first property set 308 based on log 214 and a second property set 310 based on logs 216. First property set 308 and second property set 310 include any properties associated with control plane operations recorded in the respective logs, such as but not limited to, a day of the week the control plane operation was executed, a time of day the control plane operation was executed, a name or operation identifier (ID) of the control plane operation, a service ID (e.g., a service principal object ID) associated with the cloud application that executed the control plane operation, a resource ID (e.g., of a resource and/or group of resources) to which the control plane operation was applied, a type of resource created (e.g., a virtual machine type), information about compute resources created, deployed, and/or otherwise interacted with (e.g., computer processing unit (CPU) size, presence of a graphics card, type graphics card, scale set capacity, etc.), the region the computing device that issued the control operation is located in, and/or any other property associated with the control plane operation executed by the cloud application, the cloud application, and/or associated entities suitable for detecting potential malicious activity.

In step 408, a malicious activity score is determined based on the first property set and the second property set. The malicious activity score is indicative of a degree to which the first control plane operation is anomalous with respect to the entity. For example, property analysis engine 304 determines a malicious activity store based at least on first property set 308 and second property set 310. The malicious activity score is indicative of a degree to which the first control plane operation associated with first property set 308 is anomalous with respect to the entity. Additional details regarding the determination of malicious activity scores are discussed with respect to FIGS. 6 and 7, as well as elsewhere herein.

As described above, operation property extractor 302 generates second property set 310 from a plurality of logs (e.g., logs 216). Depending on the implementation, property analysis engine 304 may determine an average of a property across executions of control plane operations recorded in logs 216, a maximum of a property across the executions, a minimum of a property across the executions, a mode of a property across the executions, and/or the like in order to determine a malicious activity score. For instance, property analysis engine 304 in a non-limiting example determines the average number of compute resources created with respect to an entity (e.g., a subscription) in a given time period (e.g., per day, per week, per month, etc.) based on a number of compute resources created property extracted from logs 216. Furthermore, property analysis engine 304 in this non-limiting example determines the maximum number of compute resources created with respect to the entity in a single instance (e.g., an execution of a single control plane operation, execution of subsequent control plane operations, etc.) or within a shortened period of time (e.g., a number of minutes, a number of hours, a day).

In some embodiments, property analysis engine 304 considers certain operation properties of first property set 308 and second property set 310 depending on another operation property of first property set 308. As a non-limiting example, suppose first property set 308 includes an operation type property that indicates the first control plane operation is creating a single virtual machine. In this context, property analysis engine 304 may evaluate properties of first property set 308 with respect to properties of second property set 310, such as but not limited to, the size of the virtual machine, how many queries the virtual machine may process, the amount of memory the virtual machine has, the storage space (e.g., disk space) of the virtual machine, the operating system of the virtual machine, an image used for the virtual machine, whether the virtual machine has a dedicated graphics card, and/or the like. In an alternative non-limiting example, suppose first property set 308 includes an operation type property that indicates the first control plane operation is creating a cluster of virtual machines. In this context, property analysis engine 304 may evaluate properties of first property set 308 with respect to properties of second property set 310, such as but not limited to, the capacity of the virtual machine cluster, the number of virtual machines in the cluster, functions of the virtual machines, and/or the like.

In some embodiments, property analysis engine 304 determines multiple malicious activity scores. For instance, property analysis engine 304 may determine a first malicious activity score indicative of a degree to which the first control plane operation is anomalous with respect to an average activity of the entity (e.g., the average executions of a particular type of control plane operation in a given first period of time (e.g., an hour, a day) over a second period of time (a week, a month, etc.), the average number of compute resources created in a given first period of time over a second period of time, the average capacity of compute resources per execution of a control plane operation, etc.) and a second malicious activity score indicative of a degree to which the first control plane operation is anomalous with respect to a maximum activity of the entity (e.g., the most executions of a particular type of control operation in a given period of time (e.g., in a day, a week, a month, etc.), the most number of compute resources created in a given period of time, the greatest capacity of compute resources in a given period of time, etc.).

In step 410, a determination that the first control plane operation potentially corresponds to malicious activity is made based on the determined malicious activity score. For example, property analysis engine 304 of FIG. 3 determines that the first control plane operation potentially corresponds to malicious activity based at least on the malicious activity score determined in step 408. As shown in FIG. 3, property analysis engine 304 generates indication 312 and provides indication 312 to security alert generator 306. In accordance with an embodiment, indication 312 includes a determination result indicating that the first control plane operation potentially corresponds to malicious activity as well as the determined malicious activity score. Alternatively, indication 312 is a (e.g., binary) indication that the first control plane operation potentially corresponds to malicious activity.

As discussed above with respect to step 408, property analysis engine 304 may determine multiple malicious activity scores with respect to the first control plane operation. For instance, a first malicious activity score indicative of a degree to which the first control plane operation is anomalous with respect to an average activity of the entity and a second malicious activity score indicative of a degree to which the first control plane operation is anomalous with respect to a maximum activity of the entity. In this context, property analysis engine 304 may determine if the first control plane operation potentially corresponds to malicious activity based on an analysis of both the first and second malicious activity scores. For instance, suppose the first malicious activity score indicates that the first control plane operation is anomalous with respect to the average activity of an entity, but the second malicious activity score indicates that the first control plane operation is not anomalous with respect to the maximum activity of the entity. As a non-limiting example, users of a subscription may create many resources on a particular day of the month, perform certain tasks during a particular time of a billing period, or otherwise execute certain control plane operations in (relatively) large amounts at a particular moment. This spike in activity may appear anomalous with respect to the first malicious activity score, but does not appear anomalous with respect to the second malicious activity score. Depending on the implementation, property analysis engine 304 may further evaluate execution of control plane operations with respect to the entity in response to the first malicious activity score indicating potential malicious activity and the second malicious activity score not indicating potential malicious activity.

For example, property analysis engine 304 in a further example embodiment evaluates how often the entity operates at maximum activity in a given period of time (e.g., a week, a month, a billing period, etc.) and determines whether the execution of the first control plane operation is anomalous based on this further analysis. For instance, if the entity typically only operates at maximum activity once per month and property analysis engine 304 determines that the execution of the first control plane operation is corresponds to a second instance of maximum activity in a month, property analysis engine 304 determines that the first control plane operation potentially corresponds to malicious activity based at least on this further analysis. In this context, property analysis engine 304 determines a (e.g., typical) pattern of periods where the entity operates above average activity and further determines if the execution of the first control plane operation corresponds to the pattern of activity of the entity. By considering an entity's pattern of activity, embodiments of the present disclosure reduce the number of "false flags" where a security alert would erroneously be generated for an entity's maximum activity, despite that usage falling within the entity's typical pattern of activity. Thus, embodiments of the present disclosure may further increase the efficiency and/or accuracy of security alert generation, increase the efficiency and/or accuracy of control plane mitigation, and/or reduce compute resources used in generating security alerts by reducing the number of "false flags."

In step 412, responsive to the determination that the first control plane operation potentially corresponds to malicious activity, a security alert is generated. For example, security alert generator 306 of FIG. 3 generates security alert 218 in response to indication 312. Security alert 218 may include information associated with the determination(s) made by property analysis engine 304, indication 312, first property set 308, second property set 310, log 214, logs 216, and/or any other information associated with the control plane operation executed by the cloud application, as described elsewhere herein.

In embodiments, security alert generator 306 may generate security alert 218 based on one record of a control plane operation executed by a cloud application or a plurality of records of control plane operations executed by one or more cloud applications. For example, property analysis engine 304 may determine a plurality of control plane operations across multiple records (e.g., in the same log or in multiple logs) potentially correspond to malicious activity. In this example, property analysis engine 304 determines and evaluates malicious activity scores of the plurality of control plane operations. For example, property analysis engine 304 may aggregate executions of control plane operations based at least on service IDs, affected resource groups, an operation type, when the control plane operation was executed, and/or any other property of the control plane operation, as described elsewhere herein, in order to determine that the control plane operations potentially correspond to malicious activity. In this context, if property analysis engine 304 determines that the plurality of control plane operations potentially correspond to malicious activity, security alert generator 306 generates security alert 218. Security alert 218 may include information associated with each of the control plane operations, respective malicious activity scores, and/or any other information associated with the aggregated control plane operations. For example, security alert 218 may include a rank of each control plane operation in terms of how likely it corresponds to malicious activity (i.e., a measure of a degree to which the control plane operation is anomalous with respect to the entity).

As described elsewhere herein, embodiments of management services may mitigate control plane operations based on determinations that the control plane operation potentially corresponds to malicious activity. For instance, FIG. 5 shows a flowchart 500 of a process for mitigating a control plane operation, in accordance with an embodiment. Mitigator 128 of FIG. 1 may operate according to flowchart 500 in embodiments. Note that flowchart 500 need not be performed in all embodiments. Further structural and operational embodiments will be apparent to persons skilled in the relevant art(s) based on the following description of FIG. 5.

Flowchart 500 includes step 502. In step 502, the first control plane operation is mitigated based on the determination that the first control plane operation potentially corresponds to malicious activity. For example, mitigator 128 of FIG. 1 mitigates a first control plane operation based on a determination that the first control plane operation potentially corresponds to malicious activity (e.g., by property analysis engine 304 as described with respect to FIGS. 3 and 4). In accordance with an embodiment, mitigator 128 mitigates the control plane operation in response to indication 312. Alternatively, mitigator 128 may mitigate the control plane operation in response to security alert 218 or a request received from a computing device (e.g., computing devices 102A-102N) on behalf of a user (e.g., a customer user, an individual user, an administrative user, a service team user, etc.) or an application executing thereon (e.g., an antivirus application). Depending on the technique used to mitigate the control plane operation, mitigator 128 mitigates the control plane operation or generates a mitigation signal that causes a mitigation step to be performed by one or more of resource manager 110, malicious activity detector 112, a computing device of computing devices 102A-102N, another component or subcomponent of system 100, and/or another computing device or application, as described elsewhere herein, or as would be understood by a person of skill in the relevant art(s) having benefit of this disclosure.

As discussed above, mitigator 128 may cause a mitigation step to be performed based on a generated security alert (e.g., security alert 218) or an indication that a control plane operation potentially corresponds to malicious activity (e.g., indication 312) by generating a mitigation signal. Examples of a mitigation signal include, but are not limited to, a notification (e.g., to an administrator) that indicates potential malicious activity has been detected, provides a description of the potential malicious activity (e.g., by specifying the control plane operations associated with the malicious activity, specifying the IP address(es) from which the control plane operations were initiated, times at which the control plane operations occurred, an identifier of the entity that initiated the control plane operations, an identifier of the resource(s) that were accessed or attempted to be accessed, one or more generated malicious activity scores, etc.), causes an access key utilized to access, deploy, or create the resource(s) to be changed, removes resource(s), deallocates resource(s), restricts access to resource(s), and/or the like. The notification may comprise a short messaging service (SMS) message, a telephone call, an e-mail, a notification that is presented via an incident management service, a security tool, etc. Other examples of mitigation signals include, but are not limited to, commands issued to resource manager 110, commands issued to malicious activity detector 112, and/or commands issued to another component or subcomponent of system 100. Such commands include, but are not limited to, commands to change (e.g., rotate) keys used to access, deploy, and/or create resources, commands to set permissions for a user or application, commands to alter alert thresholds, and/or other commands suitable for mitigating a control plane operation. It is noted that notifications may be issued responsive to detecting potentially malicious control plane operations regardless of whether such operations are actually malicious. In this way, an administrator may decide for himself or herself as to whether the detected operations are malicious based on an analysis thereof.

Embodiments of malicious activity detectors may determine whether a control plane operation potentially corresponds to malicious activity in various ways, in embodiments. For example, FIG. 6 shows a flowchart 600 of a process for determining that a control plane operation potentially corresponds to malicious activity, in accordance with an embodiment. Property analysis engine 304 of FIG. 3 may operate according to flowchart 600 in embodiments. Note that not all steps of flowchart 600 need be performed in all embodiments. Further structural and operational embodiments will be apparent to persons skilled in the relevant art(s) based on the following description of FIG. 6.

Flowchart 600 begins with step 602, which is a further embodiment of step 408 of flowchart 400 as described with respect to FIG. 4. In step 602, the malicious activity score is determined based on a comparison of a first property of the first property set and a second property of the second property set. For example, property analysis engine 304 determines a malicious activity score based at least on a comparison of a first property of first property set 308 and a second property of second property set 310. In accordance with an embodiment, the first property and the second property are the same type of property. As a non-limiting example, suppose the first control plane operation is a create cluster operation and property analysis engine 304 determines a malicious activity score based at least on the number of compute resources created in a cluster by a create cluster operations. In this context, property analysis engine 304 compares a first property of first property set 308 indicative of how many compute resources were created in the cluster with a second property of second property set 310 indicative of how many compute resources were created in clusters in the execution of previous control plane operations associated with the entity. In some embodiments, the second property of second property set 310 represents an average (or maximum, or minimum, or mode, etc.) of the second property across multiple control plane operations recorded in logs 216.

In accordance with one or more embodiments, property analysis engine 304 determines trends based on the second properties of second property set 310 (e.g., an increasing trend in executions of a type of control plane operation, a decreasing trend in executions of a type of control plane operation, an average number of executions of a type of control plane operation, etc.). In this context, property analysis engine 304 determines a malicious activity score by comparing the first property of first property set 308 to the determined trend. For instance, property analysis engine 304 in a non-limiting example determines a degree to which the number of resources created by an execution of a create resource operation is anomalous with respect to a determined trend in the number of resources created by executions of create resource operations with respect to an entity.

Alternatively (or additionally), property analysis engine 304 compares properties of the first and second property sets directly. For instance, property analysis engine 304 in another non-limiting example analyzes the names of virtual machines created by the execution of create resource operations with respect to an entity in first property set 308 and second property set 310. In this example, if property analysis engine 304 determines that the names of created virtual machines in first property set 308 are not similar to names of created virtual machines in second property set 310 (e.g., the names do not follow a naming pattern typically used by the entity, do not follow a sequence used by the entity, and/or the like), property analysis engine 304 determines a malicious activity score that is higher than if the names were similar (i.e., were less anomalous with respect to the entity).

In some embodiments, property analysis engine 304 determines a malicious activity score based on a comparison of multiple properties of first property set 308 with respective properties of second property set 310. In this context, each comparison result is represented as a component score and the malicious activity score is a combination of the component scores. In some implementations, each comparison score may be adjusted by a weight. In this way, properties that are more likely to indicate potentially malicious activity are given a higher weight than properties that are less likely to indicate potentially malicious activity. In some embodiments, not all properties of first and second property sets 308 and 310 are compared.

Flowchart 600 continues to step 604, which is a further embodiment of step 410 of flowchart 400 as described with respect to FIG. 4. In step 604, a determination that the malicious activity score is greater than an alert threshold is made. For example, property analysis engine 304 determines the malicious activity score generated in step 602 is greater than an alert threshold to determine that the first control plane operation potentially corresponds to malicious activity. In accordance with an embodiment, different alert thresholds are used depending on the type of control plane operation (e.g., a first alert threshold is used for create resource operations, a second alert threshold is used for permission change operations, etc.). Alert thresholds may be set by the cloud service provider, a tenant of the cloud service, a subscription of the cloud service, a user of the cloud service, an administrator, or a service team user. In some embodiments, alert thresholds may be dynamically adjusted depending on certain factors (e.g., control plane operation type, surrounding operations, the issuer of the control plane operation (e.g., the type of user, the type of service principal, etc.), type of device that issued the control plane operation, type of authentication used by the issuer, the frequency of control plane operations, etc.). Additional details regarding adjusting alert thresholds are discussed with respect to FIGS. 7 and 8.

In some embodiments, property analysis engine 304 utilizes multiple alert thresholds to determine whether or not a control plane operation potentially corresponds to malicious activity. For instance, suppose property analysis engine 304 determined a first malicious activity score corresponding to an average activity of an entity and a second malicious activity score corresponding to the maximum activity of an entity (e.g., as discussed with respect to steps 408 and 410 of flowchart 400 of FIG. 4). In this context, property analysis engine 304 may compare the first malicious activity score to a first alert threshold and the second malicious activity score to a second (e.g., higher) alert threshold.

III. Example Surrounding Operation Analysis Embodiments

As described herein, embodiments and techniques described herein detect malicious activity in cloud computing platforms based on a control plane operation and previously executed control plane operations. Furthermore, it is also contemplated herein that embodiments may evaluate control plane operations executed in relation to, in proximity to, or otherwise surrounding a particular control plane operation. For example, a malicious activity detector may evaluate control plane operations executed in the same session as a first control plane operation, executed in a session (e.g., by or associated with the same entity, user, service principal, etc.) preceding the session the first control plane operation was executed in, executed in a session (e.g., by or associated with the same entity, user, service principal, etc.) succeeding the session the first control plane operation was executed in, executed by the same device or network address as the first control plane operation, or otherwise executed in association with the entity in proximity to the first control plane operation. Such operations may be described as "surrounding operations" herein. Malicious activity detectors described herein may evaluate these surrounding operations to determine if the first control plane operation potentially corresponds to malicious activity. to adjust alert thresholds, to generate malicious activity scores, and/or otherwise to detect malicious activity in a cloud computing platform.

Figure 7:
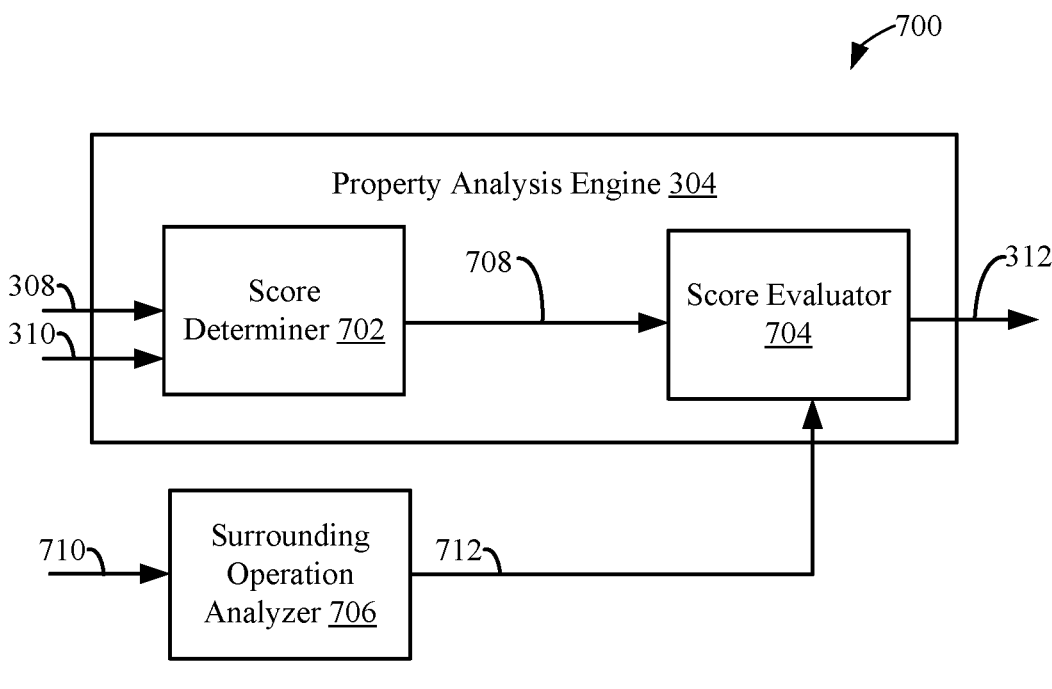
FIG. 7 shows a block diagram of a system for adjusting an alert threshold, in accordance with an embodiment.

In accordance with one or more embodiments, a malicious activity detector analyzes surrounding operations and adjusts an alert threshold. For instance, FIG. 7 shows a block diagram of a system 700 for adjusting an alert threshold, in accordance with an embodiment. As shown in FIG. 7, system 700 includes property analysis engine 304 as described with respect to FIG. 3 and a surrounding operation analyzer 706. While surrounding operation analyzer 706 is shown in FIG. 7 as external to property analysis engine 304, it is also contemplated herein that surrounding operation analyzer 706 may be a subservice of property analysis engine 304. As also shown in FIG. 7, property analysis engine 304 includes a score determiner 702 and a score evaluator 704. Score determiner 702 and score evaluator 704 may operate according to steps 408 and 410 of flowchart 400, as described with respect to FIG. 4. For instance, score determiner 702 determines malicious activity score 708 based on first property set 308 and second property set 310 according to step 408 and score evaluator 704 generates indication 312 based at least on malicious activity score 708 according to step 410. In accordance with an embodiment, score determiner 702 is a rule-based score generator.

Figure 8:
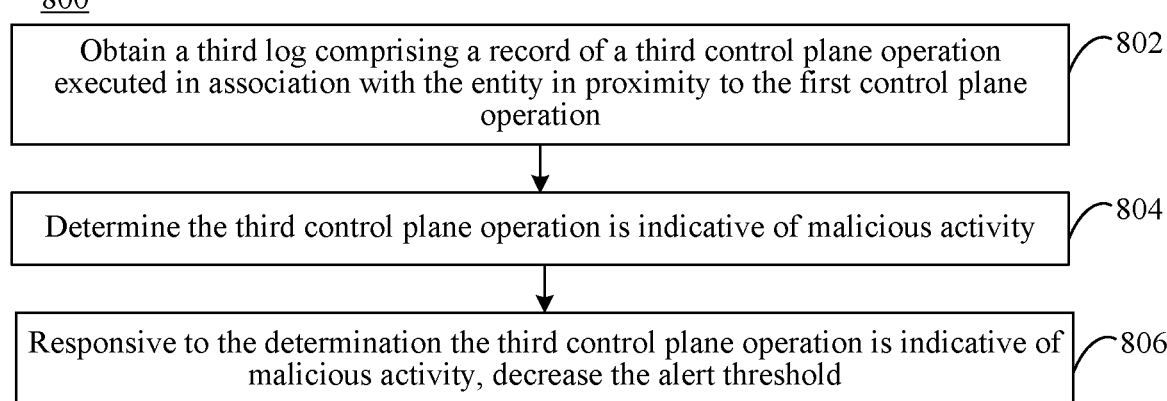
FIG. 8 shows a flowchart of a process for adjusting an alert threshold, in accordance with an embodiment.

For illustrative purposes, system 700 of FIG. 7 is described below with respect to FIG. 8. FIG. 8 shows a flowchart 800 of a process for adjusting an alert threshold, in accordance with an embodiment. System 700 may operate according to flowchart 800 in embodiments. Note that not all steps of flowchart 800 need be performed in all embodiments. Further structural and operational embodiments will be apparent to persons skilled in the relevant art(s) based on the following descriptions of FIGS. 7 and 8.

Flowchart 800 begins with step 802. In step 802, a third log comprising a record of a third control plane operation executed in association with the entity in proximity to the first control plane operation is obtained. For example, surrounding operation analyzer 706 obtains a third log 710 by accessing logs 204 of data storage 202 of FIG. 2. Third log 710 may be a log of close proximity logs 206 or historic logs 208, depending on the implementation. Alternatively, third log 710 includes all or a portion of log 214. In another alternative embodiment, third log 710 is streamed to surrounding operation analyzer 706 (e.g., by resource manager 110 of FIG. 1). In some embodiments, surrounding operation analyzer 706 obtains third log 710 based on a property or other information recorded in log 214 (e.g., a subscription ID of log 214, a user ID of log 214, etc.).

As a non-limiting, illustrative example, suppose the first control plane operation and the plurality of second control plane operations are compute resource creation operations. In this example, surrounding operation analyzer 706 obtains logs that are in proximity to the log (log 214) comprising the record of the first control plane operation (e.g., logs preceding log 214, logs succeeding log 214, etc.). Surrounding operation analyzer 706 may also analyze other control plane operations included in log 214 (e.g., operations other than the first control plane operation). In this example, surrounding operation analyzer 706 may analyze a single operation or multiple control plane operations.

In step 804, a determination that the third control plane operation is indicative of malicious activity is made. For example, surrounding operation analyzer 706 of FIG. 7 determines if the third control plane operation is (e.g., potentially) indicative of malicious activity. Surrounding operation analyzer 706 may make this determination based on properties extracted from third log 710 (e.g., by operation property extractor 302, or by using techniques similar to those described with respect to operation property extractor 302). In accordance with an embodiment surrounding operation analyzer 706 compares the extracted properties to properties of second property set 310. In accordance with an embodiment, surrounding operation analyzer 706 compares the extracted properties to previously executed control plane operations of the same type as the third control plane operation. In accordance with an embodiment, surrounding operation analyzer 706 determines if the third control plane operation is included in a list of impactful operations, or operations that are correlated to potentially malicious activity. Additional details regarding impactful operations and other operations correlated to potentially malicious activity are discussed with respect to FIGS. 9 and 10A.

Continuing the running example described above with respect to step 802, surrounding operation analyzer 706 determines whether the one or more surrounding operations in the obtained logs in proximity to the first log are (e.g., potentially) indicative of malicious activity. Surrounding operation analyzer 706 may extract and analyze properties of these surrounding operations, compare these surrounding operations to a list of impactful operations, or otherwise analyze the surrounding operations to make this determination. For instance, suppose surrounding operation analyzer 706 identifies a control plane operation in the surrounding operations that raises a computational power quota above the usual quota (or range of quotas) set by the entity, an operation that removes or alters firewall rules to reduce access limitations, an operation that downloads access credentials, an operation that installs a particular type of software (e.g., a crypto mining software), an operation that installs a particular type of driver (e.g., a graphics processing unit (GPU) driver), and/or any other type of operation that, when executed in proximity to a compute resource creation operation, is indicative of potentially malicious activity. As a further non-limiting example, suppose an administrator has flagged activities related to mining crypto currencies as potentially malicious activities. In this context, surrounding operation analyzer 706 identifies control plane operations that install crypto mining software, install drivers associated with crypto mining (e.g., GPU drivers), operations that increase the entity's resource quote (thereby enabling more compute resources to be created), and/or any other operation that potentially indicates a malicious entity (e.g., a hacker) has infiltrated an entity's account and is leveraging the compromised account to mine crypto currencies.

In step 806, responsive to the determination that the third control plane operation is indicative of malicious activity, the alert threshold is decreased. For example, surrounding operation analyzer 706, responsive to the determination made in step 804, generates a threshold modification signal 712 and transmits threshold modification signal 712 to score evaluator 704 to adjust (e.g., decrease) an alert threshold that score evaluator 704 evaluates malicious activity score 708 against (e.g., as described with respect to flowchart 600 of FIG. 6).

While flowchart 800 has been described with respect to decreasing alert thresholds, it is also contemplated herein that surrounding operations may be analyzed to determine whether to increase an alert threshold. For instance, surrounding operation analyzer 706 may analyze log 710 and determine that the third control plane operation corresponds to regular activity of an entity and is unlikely to correspond to malicious activity, in this context, surrounding operation analyzer 706 may generate threshold modification signal 712 to increase an alert threshold.

Figure 9:
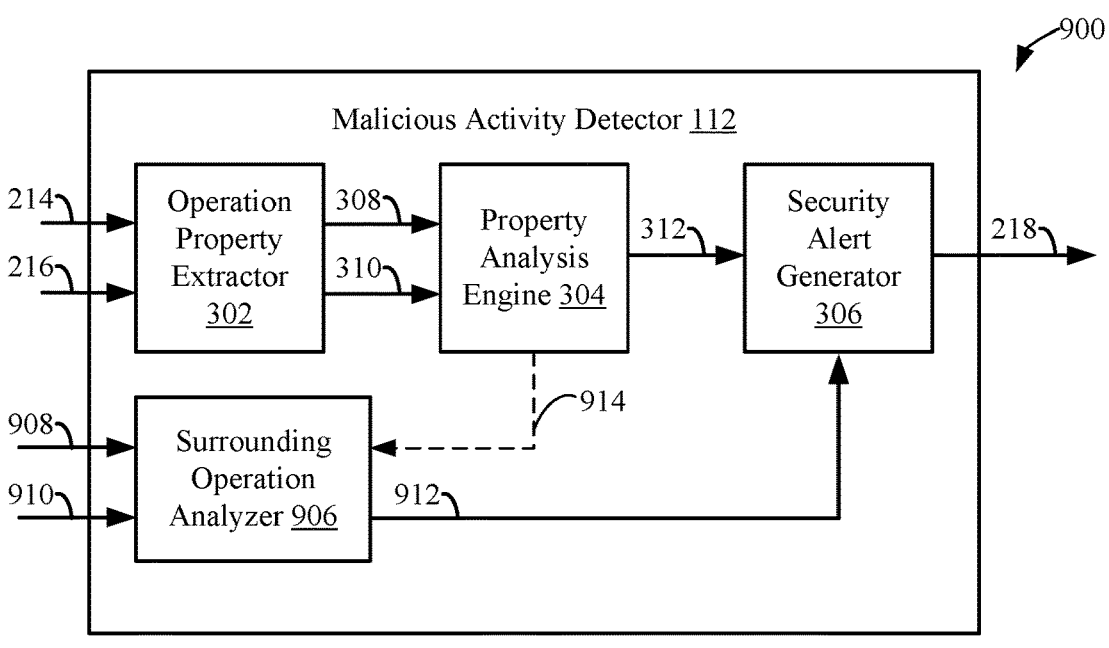
FIG. 9 shows a block diagram of the malicious activity detector of FIG. 1, in accordance with an embodiment.

As discussed above, malicious activity detectors may analyze surrounding operations and adjust alert threshold based on the analysis. Alternatively (or additionally) a malicious activity detector may analyze surrounding operations to determine that a security alert should be generated (e.g., by overriding or supplementing analysis made by a property analysis engine). For example, FIG. 9 shows a block diagram 900 of malicious activity detector 112 of FIG. 1, in accordance with an embodiment. As shown in FIG. 9 malicious activity detector 112 also includes a surrounding operation analyzer 906. In some embodiments, surrounding operation analyzer 906 performs similar functions as surrounding operation analyzer 706 of FIG. 7.

Figure 10A:
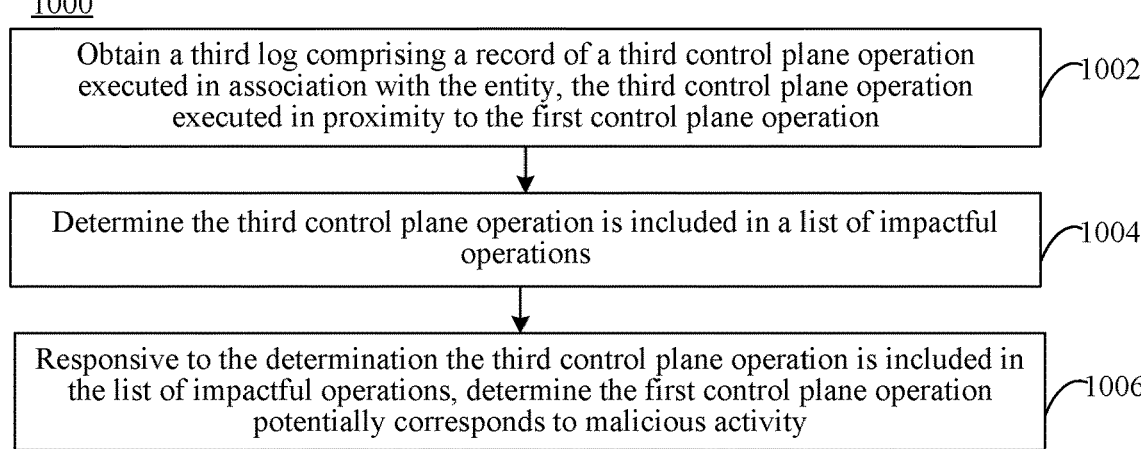
FIG. 10A shows a flowchart of a process for determining that a security alert should be generated, in accordance with an embodiment.

For illustrative purposes, malicious activity detector 112 of FIG. 9 is described below with respect to FIG. 10A. FIG. 10A shows a flowchart 1000 of a process for determining that a security alert should be generated, in accordance with an embodiment. Malicious activity detector 112 may operate according to flowchart 1000 in embodiments. Note that not all steps of flowchart 1000 need be performed in all embodiments. Further structural and operational embodiments will be apparent to persons skilled in the relevant art(s) based on the following descriptions of FIGS. 9 and 10A.

Flowchart 1000 starts with step 1002. In step 1002, a third log comprising a record of a third control plane operation executed in association with the entity in proximity to the first control plane operation is obtained. For example, surrounding operation analyzer 906 obtains a third log 908 by accessing logs 204 of data storage 202 of FIG. 2. Third log 908 may be a log of close proximity logs 206 or historic logs 208, depending on the implementation. Alternatively, third log 908 includes all or a portion of log 214. In another alternative embodiment, third log 908 is streamed to surrounding operation analyzer 706 (e.g., by resource manager 110 of FIG. 1). In some embodiments, surrounding operation analyzer 906 obtains third log 908 based on a property or other information recorded in log 214 (e.g., a subscription ID of log 214, a user ID of log 214, etc.). In accordance with an embodiment discussed further with respect to FIG. 10B, surrounding operation analyzer 906 obtains third log 908 in response to a malicious activity score being greater than a flag threshold.

In step 1004, a determination that the third control plane operation is included in a list of impactful operations is made. For instance, surrounding operation analyzer 906 determines if the third control plane operation recorded in third log 908 is included in a list of impactful operations 910. Impactful operations are operations that have been determined to have a relatively high impact upon the security of a cloud-based system (e.g., a cloud computing platform). Examples of impactful operations may include operations that, when executed, modify a rule of a firewall, create a rule of a firewall, access authentication keys (e.g., host keys, user keys, or public and private key pairs), install a particular type of software (e.g., a software flagged as potentially malicious software (e.g., crypto mining software, software that may contain malware, and/or the like)), modify a compute cluster, create a compute cluster, modify a security rule (e.g., a security alert suppression rule), create a security rule, access a storage (e.g., a secret storage), and/or otherwise impact the cloud-based system, an application associated with the cloud-based system, and/or a user associated with the cloud-based system. List of impactful operations 910 may be stored in a data storage (e.g., data storage(s) 202), in embodiments. List of impactful operations 910 may be manually generated (e.g., by a developer of malicious activity detector 112), automatically generated (e.g., based previous malicious activity detections, based on antivirus software detecting malicious activity, etc.), or generated by a combination of automatic and manual techniques. List of impactful operations 910 may be updated on a periodic or intermittent basis to account for system changes, observed malicious behavior, updated research, or the like. In some embodiments, list of impactful operations 910 include ratings of how likely a particular type of impactful operation is indicative of potentially malicious activity. In some embodiments, list of impactful operations 910 include sub-groupings of operations that, when executed in proximity to one another, are indicative of potentially malicious activity.

In step 1006, responsive to the determination that the third control plane operation is included in the list of impactful operations, a determination that the first control plane operation potentially corresponds to malicious activity is made. For example, in response to the determination made in step 1004, surrounding operation analyzer 906 generates an indication 912 that indicates that the first control plane operation potentially corresponds to malicious activity. As shown in FIG. 9, surrounding operation analyzer 906 transmits or otherwise provides indication 912 to security alert generator 306. In this manner, surrounding operation analyzer 906 bypasses or supplements the analysis made by property analysis engine 304 in order to cause security alert generator 306 to generate security alert 218. In some embodiments, security alert generator 306 generates security alert 218 based on indications 312 and 912. For instance, security alert generator 306 generates security alert 218 with an elevated level of notification if both indications 312 and 912 indicate that the first control plane operation potentially corresponds to malicious activity (e.g., as opposed to if only one of indication 312 or indication 912 indicated that the first control plane operation potentially corresponds to malicious activity).

Figure 10B:
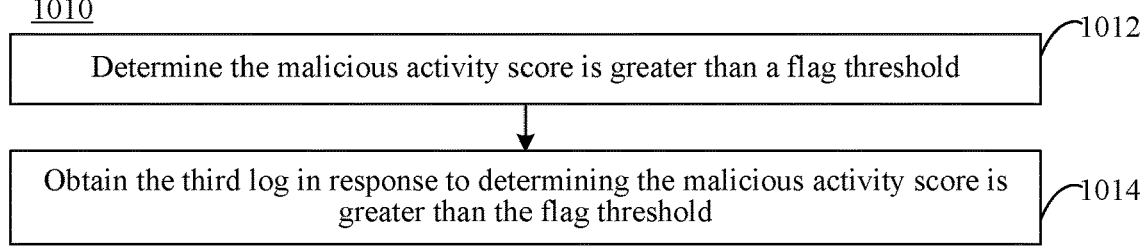
FIG. 10B shows a flowchart of a process for determining to obtain a log comprising a record of a surrounding operation, in accordance with an embodiment.

As discussed above, surrounding operation analyzer 906 obtains a log comprising a record of a surrounding operation. Surrounding operation analyzer 906 may obtain the log comprising the record of the surrounding operation in various ways, in embodiments. For instance, FIG. 10B shows a flowchart 1010 of a process for determining to obtain a log comprising a record of a surrounding operation, in accordance with an embodiment. Malicious activity detector 112 may operate according to flowchart 1010 in embodiments. Note that not all steps of flowchart 1010 need be performed in all embodiments. One or more steps of flowchart 1010 may be a further embodiment of step 1002 of flowchart 1000, as described with respect to FIG. 10A. Further structural and operational embodiments will be apparent to persons skilled in the relevant art(s) based on the following descriptions of FIGS. 9 and 10B.

Flowchart 1010 begins with step 1012. In step 1012, the malicious activity score is determined to be greater than a flag threshold. For example, property analysis engine 304 of FIG. 9 determines a malicious activity score (determined as described elsewhere herein (e.g., with respect to step 408 of FIG. 4, with respect to step 602 of FIG. 6, and/or as otherwise described elsewhere herein)) is greater than a flag threshold. In accordance with an embodiment, different flag thresholds are used depending on the type of control plane operation (e.g., a first flag threshold is used for create resource operations, a second flag threshold is used for permission change operations, etc.). Flag thresholds may be set by the cloud service provider, a tenant of the cloud service, a subscription of the cloud service, a user of the cloud service, an administrator, or a service team user. In some embodiments, flag thresholds may be dynamically adjusted depending on certain factors (e.g., control plane operation type, surrounding operations, the issuer of the control plane operation (e.g., the type of user, the type of service principal, etc.), type of device that issued the control plane operation, type of authentication used by the issuer, the frequency of control plane operations, etc.). In accordance with an embodiment, the flag threshold is adjusted in a manner similar to the techniques for adjusting alert thresholds described with respect to FIGS. 7 and 8. In accordance with an embodiment, the flag threshold is associated with an alert threshold (e.g., the flag threshold is within a predetermined range of an alert threshold, the flag threshold is a percentage of an alert threshold, etc.).

In some embodiments, property analysis engine 304 utilizes multiple flag thresholds to determine whether or not a control plane operation potentially corresponds to malicious activity. For instance, suppose property analysis engine 304 determined a first malicious activity score corresponding to an average activity of an entity and a second malicious activity score corresponding to the maximum activity of an entity (e.g., as discussed with respect to steps 408 and 410 of flowchart 400 of FIG. 4). In this context, property analysis engine 304 determines if the first malicious activity score is greater than a first flag threshold and the second malicious activity score is greater than a second (e.g., higher) flag threshold.

As shown in FIG. 9, if property analysis engine 304 determines the malicious activity score is greater than a flag threshold, property analysis engine 304 generates a flag signal 914 and provides flag signal 914 to surrounding operation analyzer 906, and flowchart 1010 continues to step 1014. Flag signal 914 includes an indication that the malicious activity score is above the flag threshold. In accordance with an embodiment, flag signal 914 comprises an identifier that surrounding operation analyzer 906 may use for obtaining third log 908 (e.g., an identifier of the control plane operation recorded in log 214, an identifier of the application and/or computing device that issued the operation, an identifier of a user (or a user's account) associated with the execution of the control plane operation, an identifier of a subscription and/or tenant associated with the execution of the control plane operation, and/or any other type of identifier or identifying information that may be used for obtaining logs that include control plane operations executed in association with the same entity as and in proximity to the control operation included in log 214). In accordance with a further embodiment, flag signal 914 comprises a timestamp of when the first control operation was executed and/or when log 214 was generated.

In accordance with an embodiment, step 1014 is a further embodiment of step 1002 of flowchart 1000. In step 1014, the third log is obtained in response to the determination that the malicious activity score is greater than the flag threshold. For instance, in response to the determination in step 1012 (and receiving flag signal 914), surrounding operation analyzer 906 obtains third log 908. By obtaining third log 908 in response to a determination that the malicious activity score is greater than the flag threshold, embodiments of the present disclosure that perform operations in accordance with flowchart 1010 (or similar operations) reduce the number of compute resources used in an initial determination of whether the malicious activity score exceeds an alert threshold because if the malicious activity score does not exceed the flag threshold, logs of surrounding operations (e.g., log 908) are not obtained.

Surrounding operation analyzer 906 may obtain third log 908 in various ways (e.g., as described with respect to step 1002 as well as elsewhere herein). In accordance with an embodiment, surrounding operation analyzer 906 obtains third log 908 by accessing logs 204 stored in data storage 202. In this context, surrounding operation analyzer 906 may use identifying information associated with the first log (e.g., log 214) to access logs 204 and obtain third log 908. For instance, surrounding operation analyzer 906 utilizes identifying information included in flag signal 914 (e.g., identifiers included therein, timestamps included therein, and/or any other information included therein suitable for obtaining logs) to obtain third log 908. As a non-limiting example, suppose flag signal 914 comprises an identifier of a user account the first control plane operation was executed with respect to, an identifier of the application that issued the first control plane operation, and a timestamp of when the first control plane operation was executed. In this example, surrounding operation analyzer 906 utilizes the information included in flag signal 914 to obtain logs that comprise operations executed with respect to the user account and issued by the application (e.g., by matching the user account identifier and the application identifier) within a particular period of time (e.g., the last hour, the last number of hours, the last day, the last number of days, etc.).

While flowchart 1010 of FIG. 10B is described with respect to FIG. 10A, it is also contemplated herein that property analysis engine 304 of FIG. 9 may determine if a malicious activity score is greater than a flag threshold and surrounding operation analyzer 906 may obtain a third log in other ways. For instance, in accordance with an alternative embodiment, surrounding operation analyzer 906 obtains third log 908, analyzes third log 908, and adjusts an alert threshold of property analysis engine 304 (e.g., in a manner similar to that described with respect to surrounding operation analyzer 706 of FIG. 7). In this context, property analysis engine 304 reevaluates the determined malicious activity score with respect to the adjusted alert threshold to determine whether or not to generate indication 312. In accordance with another alternative embodiment, surrounding operation analyzer 906 provides log 908 (or the recorded control plane operation) to operation property extractor 302 of FIG. 3. Operation property extractor 302 extracts properties of the control plane operation recorded in log 908 (e.g., using similar techniques as those described with respect to extracting properties from log 214 and/or logs 216, as described elsewhere herein) and provides the properties to property analysis engine 304. Property analysis engine 304 determines a second malicious activity score based on the extracted properties of the control plane operation recorded log 908 and first property set 308 (and optionally second property set 310) and determines if the second malicious activity score is indicative of potential malicious activity (as described elsewhere herein).

IV. Example Trend Data Analysis Embodiments

Figure 11:
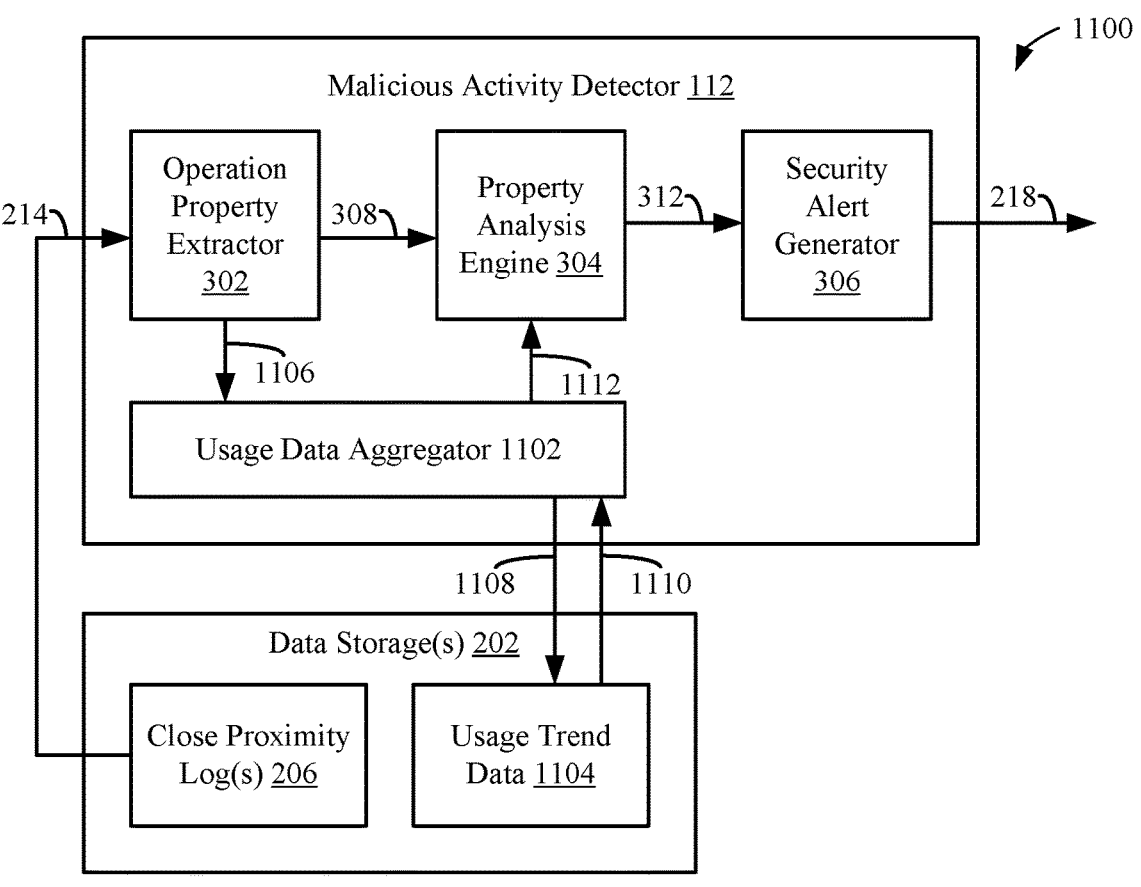
FIG. 11 shows a block diagram of a system for generating a security alert using trend data, in accordance with an embodiment.

As described herein, malicious activity detectors determine if a control plane operation executed with respect to an entity potentially corresponds to malicious activity based on operation properties generated based on a log comprising a record of the control plane operation and operation properties generated based on logs that include records of other control plane operations executed with respect to the entity. However, it is also contemplated herein that a malicious activity detector may determine if a control plane operation potentially corresponds to malicious activity based on the properties extracted from the log comprising the record of the control plane operation and trend data that is indicative of previously executed control operations associated with the entity. For example, FIG. 11 shows a block diagram of a system 1100 for generating a security alert using trend data, in accordance with an embodiment. As shown in FIG. 11, system 1100 includes malicious activity detector 112 of FIG. 1 and data storage 202 of FIG. 2. Malicious activity detector 112 includes operation property extractor 302, property analysis engine 304, and security alert generator 306, as described with respect to FIGS. 3 and 4, as well as a usage data aggregator 1102. Data storage 202 stores close proximity logs 206, as described with respect to FIG. 2, as well as usage trend data 1104. In some embodiments, usage trend data 1104 is anonymous data (e.g., data without personal identifying information, data with redacted personal identifying information, or data with limited personal identifying information).

Figure 12:
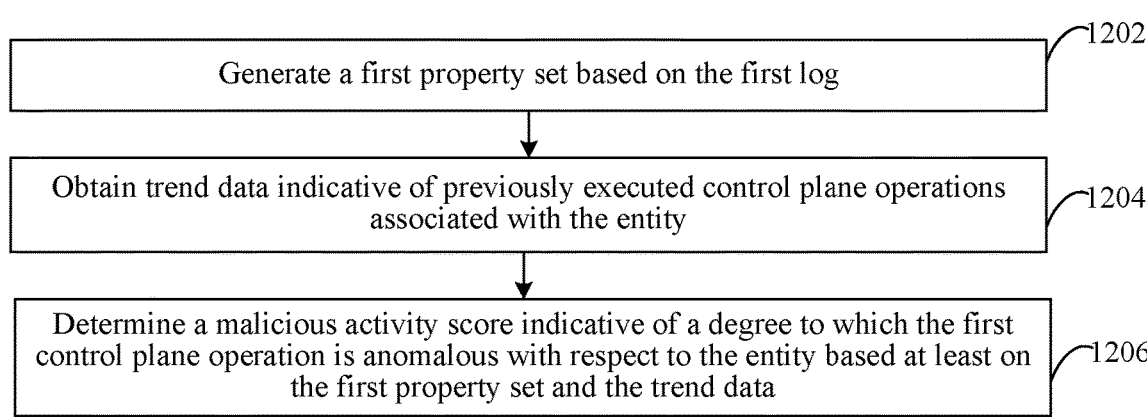
FIG. 12 shows a flowchart of a process for determining a malicious activity score, in accordance with an embodiment.

For illustrative purposes, system 1100 of FIG. 11 is described below with respect to FIG. 12. FIG. 12 shows a flowchart 1200 of a process for determining a malicious activity score, in accordance with an embodiment. System 1100 may operate according to flowchart 1200 in embodiments. Note that not all steps of flowchart 1200 need be performed in all embodiments. Further structural and operational embodiments will be apparent to persons skilled in the relevant art(s) based on the following descriptions of FIGS. 11 and 12.

Flowchart 1200 starts with step 1202. Prior to step 1202, malicious activity detector 112 may receive a first log in a similar manner as that described with respect to step 402 of flowchart 400 of FIG. 4. In step 1202, a first property set is generated based on the first log. For instance, operation property extractor 302 generates first property set 308 (e.g., as described with respect to step 406 of flowchart 400 of FIG. 4) based on first log 214.

In step 1204, trend data indicative of previously executed control plane operations associated with the entity are obtained. For instance, usage data aggregator 1102 of FIG. 11 obtains trend data 1112. Usage data aggregator 1102 may obtained trend data 11102 in various ways. For instance, as shown in FIG. 11, operation property extractor 302 determines an identifier of the entity 1106 ("entity ID 1106" hereinafter). Entity identifier 1106 may be a service ID, a tenant ID, a user ID, and/or the like, depending on the implementation. Usage data aggregator transmits a request 1108 to data storage 202 to obtain trend data of usage trend data 1104 that corresponds to entity ID 1106. Usage data aggregator 1102 receives response 1110, which includes trend data 1112. Usage data aggregator 1102 provides trend data 1112 to property analysis engine 304. Trend data 1112 is indicative of previously executed control plane operations associated with the entity identified by entity ID 1106. For instance, trend data 1112 in accordance with an embodiment includes operation properties extracted from previous control plane operations executed with respect to the entity, average activity by the entity, maximum activity by the activity, and/or other information regarding the entity and/or control plane operations executed with respect to the entity, as described elsewhere herein.

In step 1206, a malicious activity score indicative of a degree to which the first control plane operation is anomalous with respect to the entity is determined based on the first property set and the trend data. For instance, property analysis engine 304 determines a malicious activity score based at least on first property set 308 and trend data 1112. Property analysis engine 304 may determine the malicious activity score using any of the techniques described elsewhere herein, modified to incorporate trend data 112 in place of, or in addition to, a second property set determined by operation property extractor 302.

Subsequent to step 1206, malicious activity detector determines whether the first control plane operation potentially corresponds to malicious activity based at least on the malicious activity score and/or generates security alerts, as described elsewhere herein.

By utilizing usage trend data, system 1100 is able to evaluate control plane operations with respect to larger amounts of data while utilizing a smaller amount of storage space. For example, usage trend data 1104 in accordance with an embodiment includes (e.g., only) properties extracted from historic logs (e.g., as opposed to the entirety of the log). Therefore, data storage 202 is able to utilize a smaller amount of storage space to store the extracted properties. Alternatively, data storage 202 may store usage trend data corresponding to more historic logs than the number of logs that could be stored in data storage 202. Furthermore, malicious activity detector 112 does not have to repeatedly extract operation properties from historic logs. Instead, properties are extracted once and stored as usage trend data for subsequent use. Furthermore, usage data aggregator 1102 may store properties of first property set 308 subsequent to determinations that the control plane operations recorded in log 214 are not malicious executions of control plane operations (e.g., based on determinations made by property analysis engine 304, a developer of malicious activity detector 112, or a cloud service provider).

V. Example Computing Device Embodiments

As noted herein, the embodiments described, along with any circuits, components and/or subcomponents thereof, as well as the flowcharts/flow diagrams described herein, including portions thereof, and/or other embodiments, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), and/or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 13:
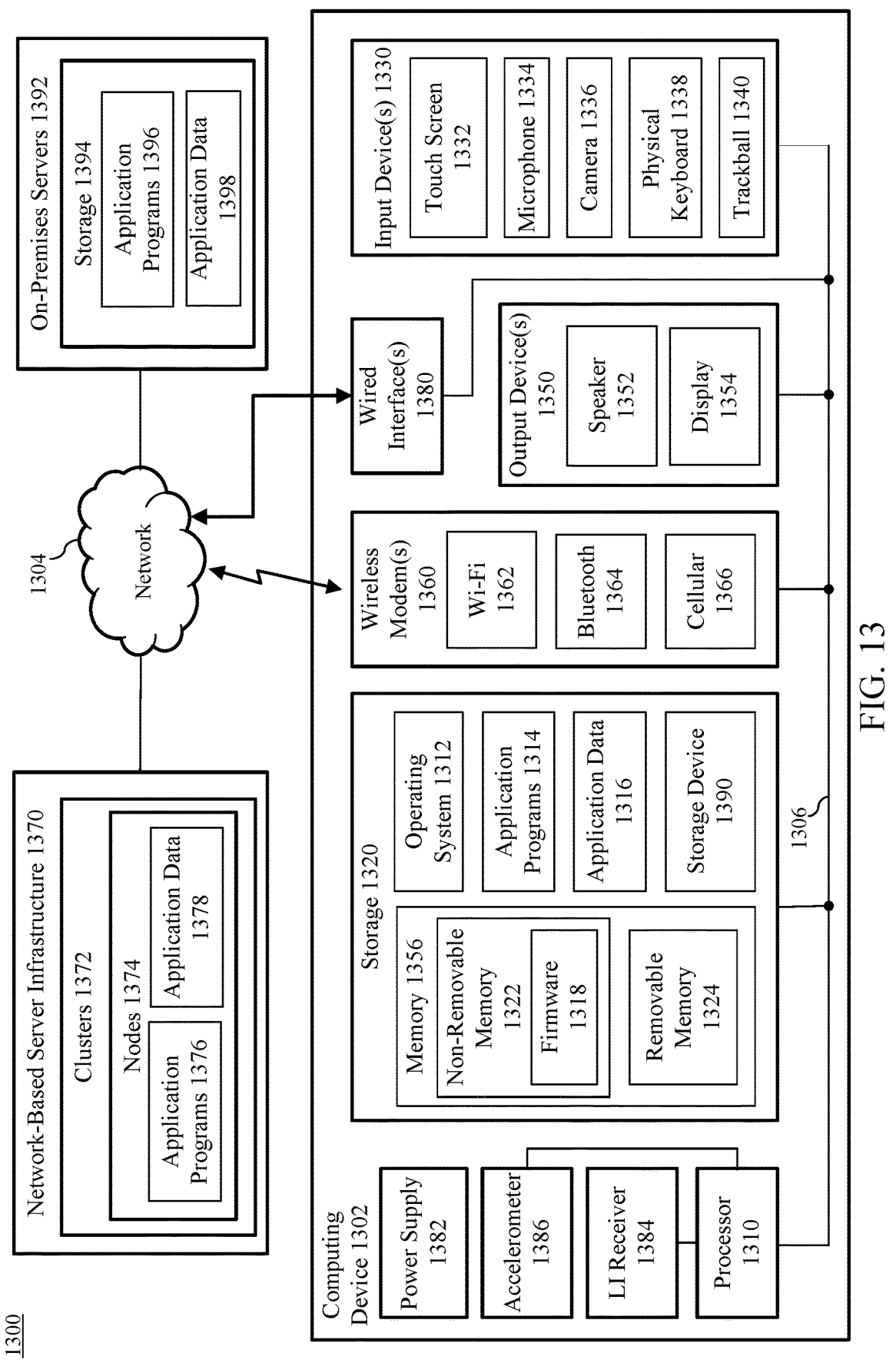
FIG. 13 shows a block diagram of an example computer system in which embodiments may be implemented.

Embodiments disclosed herein may be implemented in one or more computing devices that may be mobile (a mobile device) and/or stationary (a stationary device) and may include any combination of the features of such mobile and stationary computing devices. Examples of computing devices in which embodiments may be implemented are described as follows with respect to FIG. 13. FIG. 13 shows a block diagram of an exemplary computing environment 1300 that includes a computing device 1302. Computing device 1302 is an example of computing device 102A, computing device 102B, computing device 102N, node 116A, node 116N, node 118A, node 118N, and/or another computing device of server infrastructure 104 as described with respect to FIG. 1, system 200 as described with respect to FIG. 2, system 900 as described with respect to FIG. 9. and/or system 1100 as described with respect to FIG. 11, each of which may include one or more of the components of computing device 1302. In some embodiments, computing device 1302 is communicatively coupled with devices (not shown in FIG. 13) external to computing environment 1300 via network 1004. Network 1304 is an example of network 106 of FIG. 1. Network 1304 comprises one or more networks such as local area networks (LANs), wide area networks (WANs), enterprise networks, the Internet, etc., and may include one or more wired and/or wireless portions. Network 1304 may additionally or alternatively include a cellular network for cellular communications. Computing device 1002 is described in detail as follows.

Computing device 1302 can be any of a variety of types of computing devices. For example, computing device 1302 may be a mobile computing device such as a handheld computer (e.g., a personal digital assistant (PDA)), a laptop computer, a tablet computer, a hybrid device, a notebook computer, a netbook, a mobile phone (e.g., a cell phone, a smart phone, a phone implementing an operating system, etc.), a wearable computing device (e.g., a head-mounted augmented reality and/or virtual reality device including smart glasses), or other type of mobile computing device. Computing device 1302 may alternatively be a stationary computing device such as a desktop computer, a personal computer (PC), a stationary server device, a minicomputer, a mainframe, a supercomputer, etc.

As shown in FIG. 13, computing device 1302 includes a variety of hardware and software components, including a processor 1310, a storage 1320, one or more input devices 1330, one or more output devices 1350, one or more wireless modems 1360, one or more wired interfaces 1380, a power supply 1382, a location information (LI) receiver 1384, and an accelerometer 1386. Storage 1320 includes memory 1356, which includes non-removable memory 1322 and removable memory 1324, and a storage device 1390. Storage 1320 also stores an operating system 1312, application programs 1314, and application data 1316. Wireless modem(s) 1360 include a Wi-Fi modem 1362, a Bluetooth modem 1364, and a cellular modem 1366. Output device(s) 1350 includes a speaker 1352 and a display 1354. Input device(s) 1330 includes a touch screen 1332, a microphone 1334, a camera 1336, a physical keyboard 1338, and a trackball 1340. Not all components of computing device 1302 shown in FIG. 13 are present in all embodiments, additional components not shown may be present, and any combination of the components may be present in a particular embodiment. These components of computing device 1302 are described as follows.

A single processor 1310 (e.g., central processing unit (CPU), microcontroller, a microprocessor, signal processor, ASIC (application specific integrated circuit), and/or other physical hardware processor circuit) or multiple processors 1310 may be present in computing device 1302 for performing such tasks as program execution, signal coding, data processing, input/output processing, power control, and/or other functions. Processor 1310 may be a single-core or multi-core processor, and each processor core may be single-threaded or multithreaded (to provide multiple threads of execution concurrently). Processor 1310 is configured to execute program code stored in a computer readable medium, such as program code of operating system 1312 and application programs 1314 stored in storage 1320. Operating system 1312 controls the allocation and usage of the components of computing device 1302 and provides support for one or more application programs 1314 (also referred to as "applications" or "apps"). Application programs 1314 may include common computing applications (e.g., e-mail applications, calendars, contact managers, web browsers, messaging applications), further computing applications (e.g., word processing applications, mapping applications, media player applications, productivity suite applications), one or more machine learning (ML) models, as well as applications related to the embodiments disclosed elsewhere herein.

Any component in computing device 1302 can communicate with any other component according to function, although not all connections are shown for case of illustration. For instance, as shown in FIG. 13, bus 1306 is a multiple signal line communication medium (e.g., conductive traces in silicon, metal traces along a motherboard, wires, etc.) that may be present to communicatively couple processor 1310 to various other components of computing device 1302, although in other embodiments, an alternative bus, further buses, and/or one or more individual signal lines may be present to communicatively couple components. Bus 1306 represents one or more of any of several types of bus structures, including a memory bus or memory controller, a peripheral bus, an accelerated graphics port, and a processor or local bus using any of a variety of bus architectures.

Storage 1320 is physical storage that includes one or both of memory 1356 and storage device 1390, which store operating system 1312, application programs 1314, and application data 1316 according to any distribution. Non-removable memory 1322 includes one or more of RAM (random access memory), ROM (read only memory), flash memory, a solid-state drive (SSD), a hard disk drive (e.g., a disk drive for reading from and writing to a hard disk), and/or other physical memory device type. Non-removable memory 1322 may include main memory and may be separate from or fabricated in a same integrated circuit as processor 1310. As shown in FIG. 13, non-removable memory 1322 stores firmware 1318, which may be present to provide low-level control of hardware. Examples of firmware 1318 include BIOS (Basic Input/Output System, such as on personal computers) and boot firmware (e.g., on smart phones). Removable memory 1324 may be inserted into a receptacle of or otherwise coupled to computing device 1302 and can be removed by a user from computing device 1302. Removable memory 1324 can include any suitable removable memory device type, including an SD (Secure Digital) card, a Subscriber Identity Module (SIM) card, which is well known in GSM (Global System for Mobile Communications) communication systems, and/or other removable physical memory device type. One or more of storage device 1390 may be present that are internal and/or external to a housing of computing device 1302 and may or may not be removable. Examples of storage device 1390 include a hard disk drive, a SSD, a thumb drive (e.g., a USB (Universal Serial Bus) flash drive), or other physical storage device.

One or more programs may be stored in storage 1320. Such programs include operating system 1312, one or more application programs 1314, and other program modules and program data. Examples of such application programs may include, for example, computer program logic (e.g., computer program code/instructions) for implementing one or more of management service 108, resource manager 110, malicious activity detector 112, mitigator 128, cluster 114A, cluster 114N, node 116A, node 116N, node 118A, node 118N, VM 120A, VM 120N, clusters 122A, clusters 122N, ML workspace 124A, ML workspace 124N, scale sets 126A, scale sets 126N, operation property extractor 302, property analysis engine 304, security alert generator 306, score determiner 702, score evaluator 704, surrounding operation analyzer 706, surrounding operation analyzer 906, and/or usage data aggregator 1102, along with any components and/or subcomponents thereof, as well as the flowcharts/ flow diagrams (e.g., flowcharts 400, 500, 600, 800, 1000, 1010, and/or 1200) described herein, including portions thereof, and/or further examples described herein.

Storage 1320 also stores data used and/or generated by operating system 1312 and application programs 1314 as application data 1316. Examples of application data 1316 include web pages, text, images, tables, sound files, video data, and other data, which may also be sent to and/or received from one or more network servers or other devices via one or more wired or wireless networks. Storage 1320 can be used to store further data including a subscriber identifier, such as an International Mobile Subscriber Identifier (IMSI), and an equipment identifier, such as an International Mobile Equipment Identifier (IMEI). Such identifiers can be transmitted to a network server to identify users and equipment.

A user may enter commands and information into computing device 1302 through one or more input devices 1330 and may receive information from computing device 1302 through one or more output devices 1350. Input device(s) 1330 may include one or more of touch screen 1332, microphone 1334, camera 1336, physical keyboard 1338 and/or trackball 1340 and output device(s) 1350 may include one or more of speaker 1352 and display 1354. Each of input device(s) 1330 and output device(s) 1350 may be integral to computing device 1302 (e.g., built into a housing of computing device 1302) or external to computing device 1302 (e.g., communicatively coupled wired or wirelessly to computing device 1302 via wired interface(s) 1380 and/or wireless modem(s) 1360). Further input devices 1330 (not shown) can include a Natural User Interface (NUI), a pointing device (computer mouse), a joystick, a video game controller, a scanner, a touch pad, a stylus pen, a voice recognition system to receive voice input, a gesture recognition system to receive gesture input, or the like. Other possible output devices (not shown) can include piezoelectric or other haptic output devices. Some devices can serve more than one input/output function. For instance, display 1354 may display information, as well as operating as touch screen 1332 by receiving user commands and/or other information (e.g., by touch, finger gestures, virtual keyboard, etc.) as a user interface. Any number of each type of input device(s) 1330 and output device(s) 1350 may be present, including multiple microphones 1334, multiple cameras 1336, multiple speakers 1352, and/or multiple displays 1354.

One or more wireless modems 1360 can be coupled to antenna(s) (not shown) of computing device 1302 and can support two-way communications between processor 1310 and devices external to computing device 1302 through network 1304, as would be understood to persons skilled in the relevant art(s). Wireless modem 1360 is shown generically and can include a cellular modem 1366 for communicating with one or more cellular networks, such as a GSM network for data and voice communications within a single cellular network, between cellular networks, or between the mobile device and a public switched telephone network (PSTN). Wireless modem 1360 may also or alternatively include other radio-based modem types, such as a Bluetooth modem 1364 (also referred to as a "Bluetooth device") and/or Wi-Fi 1362 modem (also referred to as an "wireless adaptor"). Wi-Fi modem 1362 is configured to communicate with an access point or other remote Wi-Fi-capable device according to one or more of the wireless network protocols based on the IEEE (Institute of Electrical and Electronics Engineers) 802.11 family of standards, commonly used for local area networking of devices and Internet access. Bluetooth modem 1364 is configured to communicate with another Bluetooth-capable device according to the Bluetooth short-range wireless technology standard(s) such as IEEE 802.15.1 and/or managed by the Bluetooth Special Interest Group (SIG).

Computing device 1302 can further include power supply 1382, LI receiver 1384, accelerometer 1386, and/or one or more wired interfaces 1380. Example wired interfaces 1380 include a USB port, IEEE 1394 (FireWire) port, a RS-232 port, an HDMI (High-Definition Multimedia Interface) port (e.g., for connection to an external display), a DisplayPort port (e.g., for connection to an external display), an audio port, and/or an Ethernet port, the purposes and functions of each of which are well known to persons skilled in the relevant art(s). Wired interface(s) 1380 of computing device 1302 provide for wired connections between computing device 1302 and network 1304, or between computing device 1302 and one or more devices/peripherals when such devices/peripherals are external to computing device 1302 (e.g., a pointing device, display 1354, speaker 1352, camera 1336, physical keyboard 1338, etc.). Power supply 1382 is configured to supply power to each of the components of computing device 1302 and may receive power from a battery internal to computing device 1302, and/or from a power cord plugged into a power port of computing device 1302 (e.g., a USB port, an A/C power port). LI receiver 1384 may be used for location determination of computing device 1302 and may include a satellite navigation receiver such as a Global Positioning System (GPS) receiver or may include other type of location determiner configured to determine location of computing device 1302 based on received information (e.g., using cell tower triangulation, etc.). Accelerometer 1386 may be present to determine an orientation of computing device 1302.

Note that the illustrated components of computing device 1302 are not required or all-inclusive, and fewer or greater numbers of components may be present as would be recognized by one skilled in the art. For example, computing device 1302 may also include one or more of a gyroscope, barometer, proximity sensor, ambient light sensor, digital compass, etc. Processor 1310 and memory 1356 may be co-located in a same semiconductor device package, such as being included together in an integrated circuit chip, FPGA, or system-on-chip (SOC), optionally along with further components of computing device 1302.

In embodiments, computing device 1302 is configured to implement any of the above-described features of flowcharts herein. Computer program logic for performing any of the operations, steps, and/or functions described herein may be stored in storage 1320 and executed by processor 1310.

In some embodiments, server infrastructure 1370 may be present in computing environment 1300 and may be communicatively coupled with computing device 1302 via network 1304. Server infrastructure 1370, when present, may be a network-accessible server set (e.g., a cloud-based environment or platform). As shown in FIG. 13, server infrastructure 1370 includes clusters 1372. Each of clusters 1372 may comprise a group of one or more compute nodes and/or a group of one or more storage nodes. For example, as shown in FIG. 13, cluster 1372 includes nodes 1374. Each of nodes 1374 are accessible via network 1304 (e.g., in a "cloud-based" embodiment) to build, deploy, and manage applications and services. Any of nodes 1374 may be a storage node that comprises a plurality of physical storage disks, SSDs, and/or other physical storage devices that are accessible via network 1304 and are configured to store data associated with the applications and services managed by nodes 1374. For example, as shown in FIG. 13, nodes 1374 may store application data 1378.

Each of nodes 1374 may, as a compute node, comprise one or more server computers, server systems, and/or computing devices. For instance, a node 1374 may include one or more of the components of computing device 1302 disclosed herein. Each of nodes 1374 may be configured to execute one or more software applications (or "applications") and/or services and/or manage hardware resources (e.g., processors, memory, etc.), which may be utilized by users (e.g., customers) of the network-accessible server set. For example, as shown in FIG. 13, nodes 1374 may operate application programs 1376. In an implementation, a node of nodes 1374 may operate or comprise one or more virtual machines, with each virtual machine emulating a system architecture (e.g., an operating system), in an isolated manner, upon which applications such as application programs 1376 may be executed.

In an embodiment, one or more of clusters 1372 may be co-located (e.g., housed in one or more nearby buildings with associated components such as backup power supplies, redundant data communications, environmental controls, etc.) to form a datacenter, or may be arranged in other manners. Accordingly, in an embodiment, one or more of clusters 1372 may be a datacenter in a distributed collection of datacenters. In embodiments, exemplary computing environment 1300 comprises part of a cloud-based platform, although this is only an example and is not intended to be limiting.

In an embodiment, computing device 1302 may access application programs 1376 for execution in any manner, such as by a client application and/or a browser at computing device 1302.

For purposes of network (e.g., cloud) backup and data security, computing device 1302 may additionally and/or alternatively synchronize copies of application programs 1314 and/or application data 1316 to be stored at network-based server infrastructure 1370 as application programs 1376 and/or application data 1378. For instance, operating system 1312 and/or application programs 1314 may include a file hosting service client, configured to synchronize applications and/or data stored in storage 1320 at network-based server infrastructure 1370.

In some embodiments, on-premises servers 1392 may be present in computing environment 1300 and may be communicatively coupled with computing device 1302 via network 1304. On-premises servers 1392, when present, are hosted within an organization's infrastructure and, in many cases, physically onsite of a facility of that organization. On-premises servers 1392 are controlled, administered, and maintained by IT (Information Technology) personnel of the organization or an IT partner to the organization. Application data 1398 may be shared by on-premises servers 1392 between computing devices of the organization, including computing device 1302 (when part of an organization) through a local network of the organization, and/or through further networks accessible to the organization (including the Internet). Furthermore, on-premises servers 1392 may serve applications such as application programs 1396 to the computing devices of the organization, including computing device 1302. Accordingly, on-premises servers 1392 may include storage 1394 (which includes one or more physical storage devices such as storage disks and/or SSDs) for storage of application programs 1396 and application data 1398 and may include one or more processors for execution of application programs 1396. Still further, computing device 1302 may be configured to synchronize copies of application programs 1314 and/or application data 1316 for backup storage at on-premises servers 1392 as application programs 1396 and/or application data 1398.

Embodiments described herein may be implemented in one or more of computing device 1302, network-based server infrastructure 1370, and on-premises servers 1392. For example, in some embodiments, computing device 1302 may be used to implement systems, clients, or devices, or components/subcomponents thereof, disclosed elsewhere herein. In other embodiments, a combination of computing device 1302, network-based server infrastructure 1370, and/or on-premises servers 1392 may be used to implement the systems, clients, or devices, or components/subcomponents thereof, disclosed elsewhere herein.

As used herein, the terms "computer program medium," "computer-readable medium," and "computer-readable storage medium," etc., are used to refer to physical hardware media. Examples of such physical hardware media include any hard disk, optical disk, SSD, other physical hardware media such as RAMs, ROMs, flash memory, digital video disks, zip disks, MEMs (microelectronic machine) memory, nanotechnology-based storage devices, and further types of physical/tangible hardware storage media of storage 1320. Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared, and other wireless media, as well as wired media. Embodiments are also directed to such communication media that are separate and non-overlapping with embodiments directed to computer-readable storage media.

As noted above, computer programs and modules (including application programs 1314) may be stored in storage 1320. Such computer programs may also be received via wired interface(s) 1380 and/or wireless modem(s) 1360 over network 1304. Such computer programs, when executed or loaded by an application, enable computing device 1302 to implement features of embodiments discussed herein. Accordingly, such computer programs represent controllers of the computing device 1302.

Embodiments are also directed to computer program products comprising computer code or instructions stored on any computer-readable medium or computer-readable storage medium. Such computer program products include the physical storage of storage 1320 as well as further physical storage types.

VI. Additional Example Embodiments

A method is described herein. The method comprises: receiving a first log comprising a record of a first control plane operation executed by a cloud application associated with an entity; obtaining a plurality of second logs, wherein each of the second logs comprises a record of a respective second control plane operation executed in association with the entity; generating a first property set based on the first log and a second property set based on the plurality of second logs; determining a malicious activity score indicative of a degree to which the first control plane operation is anomalous with respect to the entity based on the first property set and the second property set; determining that the first control plane operation potentially corresponds to malicious activity based on the determined malicious activity score; and responsive to determining that the first control plane operation potentially corresponds to malicious activity, generating a security alert.

In one implementation of the foregoing method, the method further comprises: mitigating the first control plane operation based on said determining the first control plane operation potentially corresponds to malicious activity.

In one implementation of the foregoing method, said determining the malicious activity score comprises determining the malicious activity score based on a comparison of a first property of the first property set and a second property of the second property set. Said determining the first control plane operation potentially corresponds to malicious activity comprises determining the malicious activity score is greater than an alert threshold.

In one implementation of the foregoing method, the method comprises: obtaining a third log comprising a record of a third control plane operation executed in association with the entity in proximity to the first control plane operation; determining the third log is indicative of malicious activity; and responsive to determining the third log is indicative of malicious activity, decreasing the alert threshold.

In one implementation of the foregoing method, said obtaining the third log is in response to said determining the malicious activity score is greater than the alert threshold.

In one implementation of the foregoing method, the method comprises: obtaining a third log comprising a record of a third control plane operation executed in association with the entity in proximity to the first control plane operation; determining the third log is included in a list of impactful operations; and responsive to determining the third log is included in the list of impactful operations, determining the first control plane operation potentially corresponds to malicious activity.

In one implementation of the foregoing method, the method comprises: determining the malicious activity score is greater than a flag threshold; and obtaining the third log in response to determining the malicious activity score is greater than the flag threshold.

In one implementation of the foregoing method, the first control plane operation is a create compute resource operation.

A system is described herein. The system comprises a processor circuit and a memory device. The memory device stores program code structured to cause the processor by a cloud application associated with an entity; obtain a plurality of second logs, wherein each of the second logs comprises a record of a respective second control plane operation executed in association with the entity; generate a first property set based on the first log and a second property set based on the plurality of second logs; determine, based on the first property set and the second property set, a malicious activity score indicative of a degree to which the first control plane operation is anomalous with respect to the entity; determine, based on the determined malicious activity score, the first control plane operation potentially corresponds to malicious activity; and generate a security alert.

In one implementation of the foregoing system, the program code is further structured to cause the processor to: mitigate the first control plane operation based on said determining the first control plane operation potentially corresponds to malicious activity.

In one implementation of the foregoing system, to determine the malicious activity score, the program code is further structured to cause the processor to determine the malicious activity score based on a comparison of a first property of the first property set and a second property of the second property set. To determine the first control plane operation potentially corresponds to malicious activity, the program code is further structured to cause the processor to determine the malicious activity score is greater than an alert threshold.

In one implementation of the foregoing system, the program code is further structured to cause the processor to: obtain a third log comprising a record of a third control plane operation executed in association with the entity in proximity to the first control plane operation; determine the third log is indicative of malicious activity; and responsive to the determination the third log is indicative of malicious activity, decrease the alert threshold.

In one implementation of the foregoing system, the third log is obtained in response to the determination the malicious activity score is greater than the alert threshold.

In one implementation of the foregoing system, the program code is further structured to cause the processor to: obtain a third log comprising a record of a third control plane operation executed in association with the entity in proximity to the first control plane operation; determine the third log is included in a list of impactful operations; and responsive to the determination the third log is included in the list of impactful operations, determine the first control plane operation potentially corresponds to malicious activity.

In one implementation of the foregoing system, the program code is further structured to cause the processor to: determine the malicious activity score is greater than a flag threshold; and obtain the third log in response to the determination the malicious activity score is greater than the flag threshold.

In one implementation of the foregoing system, the first control plane operation is a create compute resource operation.

A computer-readable storage medium having computer program logic recorded thereon is described herein. When executed by a processor circuit, the program logic causes the processor circuit to perform a method. The method comprising: obtaining a first log comprising a record of a first control plane operation executed by a cloud application associated with an entity; obtaining a plurality of second logs, wherein each of the second logs comprises a record of a respective second control plane operation executed in association with the entity; generating a first property set based on the first log and a second property set based on the plurality of second logs; determining, based on the first property set and the second property set, a malicious activity score indicative of a degree to which the first control plane operation is anomalous with respect to the entity; determining, based on the determined malicious activity score, the first control plane operation potentially corresponds to malicious activity; and generating a security alert.

In one implementation of the foregoing computer-readable storage medium, the method further comprises: mitigating the first control plane operation based on said determining the first control plane operation potentially corresponds to malicious activity.

In one implementation of the foregoing computer-readable storage medium, said determining the malicious activity score comprises: determining the malicious activity score based on a comparison of a first property of the first property set and a second property of the second property set; and said determining the first control plane operation potentially corresponds to malicious activity comprises: determining the malicious activity score is greater than an alert threshold.

In one implementation of the foregoing computer-readable storage medium, the method further comprises: obtaining a third log comprising a record of a third control plane operation executed in association with the entity in proximity to the first control plane operation; determining the third log is indicative of malicious activity; and responsive to determining the third log is indicative of malicious activity, decreasing the alert threshold.

In one implementation of the foregoing computer-readable storage medium, said obtaining the third log is in response to said determining the malicious activity score is greater than the alert threshold.

In one implementation of the foregoing computer-readable storage medium, the method further comprises: obtaining a third log comprising a record of a third control plane operation executed in association with the entity in proximity to the first control plane operation; determining the third log is included in a list of impactful operations; and responsive to determining the third log is included in the list of impactful operations, determining the first control plane operation potentially corresponds to malicious activity.

In one implementation of the foregoing computer-readable storage medium, the method further comprises: determining the malicious activity score is greater than a flag threshold; and obtaining the third log in response to determining the malicious activity score is greater than the flag threshold.

In one implementation of the foregoing computer-readable storage medium, the first control plane operation is a create compute resource operation.

A method is described herein. The method comprises: receiving a first log comprising a record of a first control plane operation executed by a cloud application associated with an entity; generating a first property set based on the first log; obtaining trend data indicative of previously executed control plane operations associated with the entity; determining a malicious activity score indicative of a degree to which the first control plane operation is anomalous with respect to the entity based on the first property set and the trend data; determining that the first control plane operation potentially corresponds to malicious activity based on the determined malicious activity score; and responsive to determining that the first control plane operation potentially corresponds to malicious activity, generating a security alert.

In one implementation of the foregoing method, said determining the malicious activity score comprises determining the malicious activity score based on a comparison of a first property of the first property set and a second property of the trend data. Said determining the first control plane operation potentially corresponds to malicious activity comprises determining the malicious activity score is greater than an alert threshold.

A system is described herein. The system comprises a processor circuit and a memory device. The memory device stores program code structured to cause the processor circuit to: obtain a first log comprising a record of a first control plane operation executed by a cloud application associated with an entity; generate a first property set based on the first log; obtain trend data indicative of previously executed control plane operations associated with the entity; determine a malicious activity score indicative of a degree to which the first control plane operation is anomalous with respect to the entity based on the first property set and the trend data; determine that the first control plane operation potentially corresponds to malicious activity based on the determined malicious activity score; and responsive to the determination that the first control plane operation potentially corresponds to malicious activity, generate a security alert.

In one implementation of the foregoing system, the to determine the malicious activity score, the program code is further structured to determine the malicious activity score based on a comparison of a first property of the first property set and a second property of the trend data. To determine the first control plane operation potentially corresponds to malicious activity, the program code is further structured to determine the malicious activity score is greater than an alert threshold.

A computer-readable storage medium having computer program logic recorded thereon is described herein. When executed by a processor circuit, the program logic causes the processor circuit to perform a method comprising: receiving a first log comprising a record of a first control plane operation executed by a cloud application associated with an entity; generating a first property set based on the first log; obtaining trend data indicative of previously executed control plane operations associated with the entity; determining a malicious activity score indicative of a degree to which the first control plane operation is anomalous with respect to the entity based on the first property set and the trend data; determining that the first control plane operation potentially corresponds to malicious activity based on the determined malicious activity score; and responsive to determining that the first control plane operation potentially corresponds to malicious activity, generating a security alert.

In one implementation of the foregoing computer-readable storage medium, said determining the malicious activity score comprises determining the malicious activity score based on a comparison of a first property of the first property set and a second property of the trend data. Said determining the first control plane operation potentially corresponds to malicious activity comprises determining the malicious activity score is greater than an alert threshold.

VII. Conclusion

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the discussion, unless otherwise stated, adjectives modifying a condition or relationship characteristic of a feature or features of an implementation of the disclosure, should be understood to mean that the condition or characteristic is defined to within tolerances that are acceptable for operation of the implementation for an application for which it is intended. Furthermore, if the performance of an operation is described herein as being "in response to" one or more factors, it is to be understood that the one or more factors may be regarded as a sole contributing factor for causing the operation to occur or a contributing factor along with one or more additional factors for causing the operation to occur, and that the operation may occur at any time upon or after establishment of the one or more factors. Still further, where "based on" is used to indicate an effect being a result of an indicated cause, it is to be understood that the effect is not required to only result from the indicated cause, but that any number of possible additional causes may also contribute to the effect. Thus, as used herein, the term "based on" should be understood to be equivalent to the term "based at least on."

Numerous example embodiments have been described above. Any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Furthermore, example embodiments have been described above with respect to one or more running examples. Such running examples describe one or more particular implementations of the example embodiments; however, embodiments described herein are not limited to these particular implementations.

For example, several running examples have been described with respect to malicious activity detectors determining whether compute resource creation operations potentially correspond to malicious activity. However, it is also contemplated herein that malicious activity detectors may be used to determine whether other types of control plane operations potentially correspond to malicious activity.

Further still, several example embodiments have been described with respect to determining a pattern based on an entity's maximum and/or average activity. However, it is also contemplated herein that a pattern of activity may be determined based on minimum activity and/or lack of activity as well.

Several types of impactful operations have been described herein; however, lists of impactful operations may include other operations, such as, but not limited to, accessing enablement operations, creating and/or activating new (or previously-used) user accounts, creating and/or activating new subscriptions, changing attributes of a user or user group, changing multi-factor authentication settings, modifying federation settings, changing data protection (e.g., encryption) settings, elevating another user account's privileges (e.g., via an admin account), retriggering guest invitation e-mails, and/or other operations that impact the cloud-base system, an application associated with the cloud-based system, and/or a user (e.g., a user account) associated with the cloud-based system.

Moreover, according to the described embodiments and techniques, any components of systems, computing devices, servers, management services, resource managers, malicious activity detectors, mitigators, and/or data stores and their functions may be caused to be activated for operation/performance thereof based on other operations, functions, actions, and/or the like, including initialization, completion, and/or performance of the operations, functions, actions, and/or the like.

In some example embodiments, one or more of the operations of the flowcharts described herein may not be performed. Moreover, operations in addition to or in lieu of the operations of the flowcharts described herein may be performed. Further, in some example embodiments, one or more of the operations of the flowcharts described herein may be performed out of order, in an alternate sequence, or partially (or completely) concurrently with each other or with other operations.

The embodiments described herein and/or any further systems, sub-systems, devices and/or components disclosed herein may be implemented in hardware (e.g., hardware logic/electrical circuitry), or any combination of hardware with software (computer program code configured to be executed in one or more processors or processing devices) and/or firmware.

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described example embodiments, but should be defined only in accordance with the following claims and their equivalents.

What is claimed is:

1. A method comprising:
obtaining a first log comprising a record of a first control plane operation executed by a cloud application associated with an entity;
generating, based on the first log, a first property set comprising at least an identifier of the entity;
utilizing the identifier of the entity to obtain a plurality of second logs from a data store, wherein each of the second logs comprises a record of a respective second control plane operation executed in association with the entity prior to the first control plane operation;
generating a second property set based on the plurality of second logs;
determining, based on the first property set and the second property set, a malicious activity score indicative of a degree to which the first control plane operation is anomalous with respect to the entity;
determining malicious activity score is indicative of the first control plane operation being anomalous with respect to the entity; and
generating a security alert indicative of the first control plane operation potentially corresponding to malicious activity.

2. The method of claim 1, further comprising:
mitigating the first control plane operation based on said determining the malicious activity score is indicative of the first control plane operation being anomalous with respect to the entity.

3. The method of claim 1, wherein the first control plane operation is a create compute resource operation.

4. The method of claim 1, wherein:
said determining the malicious activity score comprises:
determining the malicious activity score based on a comparison of a first property of the first property set and a second property of the second property set; and
said determining the malicious activity score is indicative of the first control plane operation being anomalous with respect to the entity-comprises:
determining the malicious activity score is greater than an alert threshold.

5. The method of claim 4, further comprising:
obtaining a third log comprising a record of a third control plane operation executed in association with the entity in proximity to the first control plane operation;
determining the third log is indicative of malicious activity; and
responsive to determining the third log is indicative of malicious activity, decreasing the alert threshold.

6. The method of claim 5, wherein said obtaining the third log is in response to said determining the malicious activity score is greater than the alert threshold.

7. The method of claim 1, further comprising:
obtaining a third log comprising a record of a third control plane operation executed in association with the entity in proximity to the first control plane operation;
determining the third log is included in a list of impactful operations; and
responsive to determining the third log is included in the list of impactful operations, determining the first control plane operation potentially corresponds to malicious activity.

8. The method of claim 7, further comprising:
determining the malicious activity score is greater than a flag threshold; and
obtaining the third log in response to determining the malicious activity score is greater than the flag threshold.

9. A system, comprising:
a processor circuit; and
a memory device that stores program code structured to cause the processor circuit to:
obtain a first log comprising a record of a first control plane operation executed by a cloud application associated with an entity;
generate, based on the first log, a first property set comprising at least an identifier of the entity;
utilize the identifier of the entity to obtain a plurality of second logs from a data store, wherein each of the second logs comprises a record of a respective second control plane operation executed in association with the entity prior to the first control plane operation;
generate a second property set based on the plurality of second logs;
determine, based on the first property set and the second property set, a malicious activity score indicative of a degree to which the first control plane operation is anomalous with respect to the plurality of second logs;
determine, based on the determined malicious activity score indicating the first control plane operation is anomalous with respect to the plurality of second logs, the first control plane operation potentially corresponds to malicious activity; and
generate a security alert.

10. The system of claim 9, wherein the program code is further structured to cause the processor to:
mitigating the first control plane operation based on said determining the first control plane operation potentially corresponds to malicious activity.

11. The system of claim 9, wherein the first control plane operation is a create compute resource operation.

12. The system of claim 9, wherein to determine the malicious activity score, the program code is further structured to cause the processor to:
determine the malicious activity score based on a comparison of a first property of the first property set and a second property of the second property set; and
to determine the first control plane operation potentially corresponds to malicious activity, the program code is further structured to cause the processor to:
determine the malicious activity score is greater than an alert threshold.

13. The system of claim 12, wherein the program code is further structured to cause the processor to:
obtain a third log comprising a record of a third control plane operation executed in association with the entity in proximity to the first control plane operation;

determine the third log is indicative of malicious activity; and responsive to the determination the third log is indicative of malicious activity, decrease the alert threshold.

14. The system of claim 13, wherein the third log is obtained in response to the determination the malicious activity score is greater than the alert threshold.

15. The system of claim 9, wherein the program code is further structured to cause the processor to:

obtain a third log comprising a record of a third control plane operation executed in association with the entity in proximity to the first control plane operation;

determine the third log is included in a list of impactful operations; and responsive to the determination the third log is included in the list of impactful operations, determine the first control plane operation potentially corresponds to malicious activity.

16. The system of claim 15, wherein the program code is further structured to cause the processor to:

determine the malicious activity score is greater than a flag threshold; and obtain the third log in response to the determination the malicious activity score is greater than the flag threshold.

17. A computer-readable storage medium encoded with program instructions that, when executed by one or more processors, performs a method comprising:

obtaining a first log comprising a record of a first control plane operation executed by a cloud application associated with an entity;

generating, based on the first log, a first property set comprising at least an identifier of the entity;

utilizing the identifier of the entity to obtain a plurality of second logs from a data store, wherein each of the second logs comprises a record of a respective second control plane operation executed in association with the entity prior to the first control plane operation;

generating a second property set based on the plurality of second logs;

determining, based on the first property set and the second property set, a malicious activity score indicative of a degree to which the first control plane operation is anomalous with respect to the entity;

determining the malicious activity score is indicative of the first control plane operation being anomalous with respect to the entity; and generating a security alert indicative of the first control plane operation potentially corresponding to malicious activity.

18. The computer-readable storage medium of claim 17, wherein the method further comprises:

mitigating the first control plane operation based on said determining the malicious activity score is indicative of the first control plane operation being anomalous with respect to the entity.

19. The computer-readable storage medium of claim 17, wherein:

said determining the malicious activity score comprises:

determining the malicious activity score based on a comparison of a first property of the first property set and a second property of the second property set; and said determining the malicious activity score is indicative of the first control plane operation being anomalous with respect to the entity comprises:

determining the malicious activity score is greater than an alert threshold.

20. The computer-readable storage medium of claim 17, wherein the first control plane operation is a create compute resource operation.

* * * * *